(12) United States Patent  
Meier

(10) Patent No.: US 9,111,375 B2
(45) Date of Patent: Aug. 18, 2015

(54) EVALUATION OF THREE-DIMENSIONAL SCENES USING TWO-DIMENSIONAL REPRESENTATIONS

(71) Applicant: Philip Meier, Pacific Palisades, CA (US)

(72) Inventor: Philip Meier, Pacific Palisades, CA (US)

( * ) Notice: Subject to any disclaimer, the term of this patent is extended or adjusted under 35 U.S.C. 154(b) by 221 days.

(21) Appl. No.: 13/736,060

(22) Filed: Jan. 7, 2013

(65) Prior Publication Data

US 2013/0177235 A1 Jul. 11, 2013

Related U.S. Application Data

(60) Provisional application No. 61/583,193, filed on Jan. 5, 2012.

(51) Int. Cl.
*G06K 9/00* (2006.01)
*G06T 15/00* (2011.01)
*G06K 9/62* (2006.01)

(52) U.S. Cl.
CPC .............. *G06T 15/00* (2013.01); *G06K 9/6255* (2013.01)

(58) Field of Classification Search
None
See application file for complete search history.

(56) References Cited

U.S. PATENT DOCUMENTS

| 7,336,814 | B2 | 2/2008 | Boca et al. |
| 7,609,859 | B2 | 10/2009 | Lee et al. |
| 8,244,044 | B2 | 8/2012 | Hua et al. |
| 2010/0079580 | A1* | 4/2010 | Waring, IV ..................... 348/44 |
| 2011/0043540 | A1* | 2/2011 | Fancher et al. ............... 345/672 |

OTHER PUBLICATIONS

JT. Kent, D. Lee, KV. Mardia, AD. Linney, "Using Curvature Information in Shape Analysis", 1996.
L. Wiskott, TJ. Sejnowski, "Slow Feature Analysis: Unsupervised Learning of Invariance," Neural Computation, 2002.

* cited by examiner

*Primary Examiner* — Daniel Mariam
(74) *Attorney, Agent, or Firm* — Genius Patent APC; Bruce A. Hare

(57) ABSTRACT

A system adapted to implement a learning rule in a three-dimensional (3D) environment is described. The system includes: a renderer adapted to generate a two-dimensional (2D) image based at least partly on a 3D scene; a computational element adapted to generate a set of appearance features based at least partly on the 2D image; and an attribute classifier adapted to generate at least one set of learned features based at least partly on the set of appearance features and to generate a set of estimated scene features based at least partly on the set of learned features. A method labels each image from among the set of 2D images with scene information regarding the 3D scene; selects a set of learning modifiers based at least partly on the labeling of at least two images; and updates a set of weights based at least partly on the set of learning modifiers.

20 Claims, 19 Drawing Sheets

EVALUATION OF THREE-DIMENSIONAL SCENES USING TWO-DIMENSIONAL REPRESENTATIONS

CROSS-REFERENCE TO RELATED APPLICATIONS

This application claims priority to U.S. Provisional Patent Application Ser. No. 61/583,193, filed on Jan. 5, 2012.

BACKGROUND

Many potential applications (e.g., robotics, gaming environments, etc.) may wish to utilize automated visual capture and/or analysis in order to evaluate virtual and/or physical three-dimensional (3D) environments in various ways. Such applications may be limited by sensing equipment (e.g., a robot may have only a two-dimensional (2D) camera available), processing power, and/or other factors.

Existing algorithms for automated visual evaluation do not make use of combined information in 3D scenes and images at the same time. Some existing solutions use multiple cameras to construct a three dimensional representation of a scene in order to measure 3D features by virtue of multiple images. Other existing solutions use 2D images and associated 3D measurements (e.g., of a face) in order to create a model of a 3D feature (e.g., the face). Some existing systems utilize surfaces of an object for identification (e.g., facial recognition). Some existing algorithms estimate a shape from some other feature (e.g., motion or shading). In addition, some existing algorithms provide hierarchical feature selection. Some existing algorithms also utilize temporal slowness of features in an attempt to learn higher order visual features without labeled data.

As can be seen, there is a need for a general purpose way to evaluate sets of visual features by exploiting the relationship between images and scenes which can be applied to a variety of visual evaluation tasks.

BRIEF SUMMARY

The present invention relates to the field of computer vision. Particularly, the invention relates to a system that is able to select features of an image and use a combination of such invariant features to perform one or more desired visual tasks.

A hybrid method of some embodiments combines bottom-up unsupervised learning of visual features with supervised learning that employs an error function to evaluate the quality of mid-level representations of scene features.

The system of some embodiments learns the relationships among scene features, other scene features and image features using labeled examples. By using computer rendered scenes, it is possible to, for example, isolate the moments where features disappear or appear, thus having algorithms that learn more precisely than by assuming that features persist (which is not always true).

Some embodiments infer the contents and structure of a visual scene from a two dimensional image. The forward problem of computer graphics can be solved mathematically, but the inverse problem of visual inference is ill posed; there is no single solution. However, with the right set of assumptions, a problem can become tractable. For example, a machine vision problem becomes much easier in a controlled setting where the lighting is bright and homogenous, and all objects are at a fixed distance with a canonical view. Non-linear transforms of pixel intensity may be sought in order to obtain features that are invariant to changes in illumination or viewpoint. Many such invariant features may be constructed through a set of design rules, and then validated and optimized on a particular set of classification tasks.

Biological visual systems of some embodiments must be able to support many different tasks. As a result, optimizing front end features for a single task might impoverish other visual tasks. The system of some embodiments learns from one task and improves performance on other tasks based on the learning. Such improvement occurs if the learning improves the mapping from appearances to true relevant features of a scene. The learning may be general, and the features invariant to the task at hand. Object recognition may be referred to as an example of a visual task, but the reasoning, algorithms and systems of some embodiments may apply to other visual tasks as well.

Some embodiments predict object identity using scene features, and nothing else. Full knowledge of the scene features would thus determine the ceiling for performance on the task. Some embodiments are able to learn a set of features that are optimized to perform estimation of scene features (and thus likely to be invariant across tasks), and to use these same basis as inputs for one or more visual tasks.

One exemplary embodiment of the invention provides a system adapted to implement a learning rule in a three-dimensional (3D) environment. The system includes: a renderer adapted to generate a two-dimensional (2D) image based at least partly on a 3D scene; a computational element adapted to generate a set of appearance features based at least partly on the 2D image; and an attribute classifier adapted to generate at least one set of learned features based at least partly on the set of appearance features and to generate a set of estimated scene features based at least partly on the set of learned features.

Another exemplary embodiment of the invention provides an automated method adapted to provide learning about a three-dimensional (3D) scene using a set of two-dimensional (2D) images. The method includes: labeling each image from among the set of 2D images with scene information regarding the 3D scene; selecting a set of learning modifiers based at least partly on the labeling of at least two images; and updating a set of weights based at least partly on the set of learning modifiers.

Yet another exemplary embodiment of the invention provides a computer readable medium storing an image evaluation application adapted to enable learning about a three-dimensional (3D) scene using a set of two-dimensional (2D) images. The application includes sets of instructions for: labeling each image from among the set of 2D images with scene information regarding the 3D scene; selecting a set of learning modifiers based at least partly on the labeling of at least two images; and updating a set of weights based at least partly on the set of learning modifiers.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGs.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
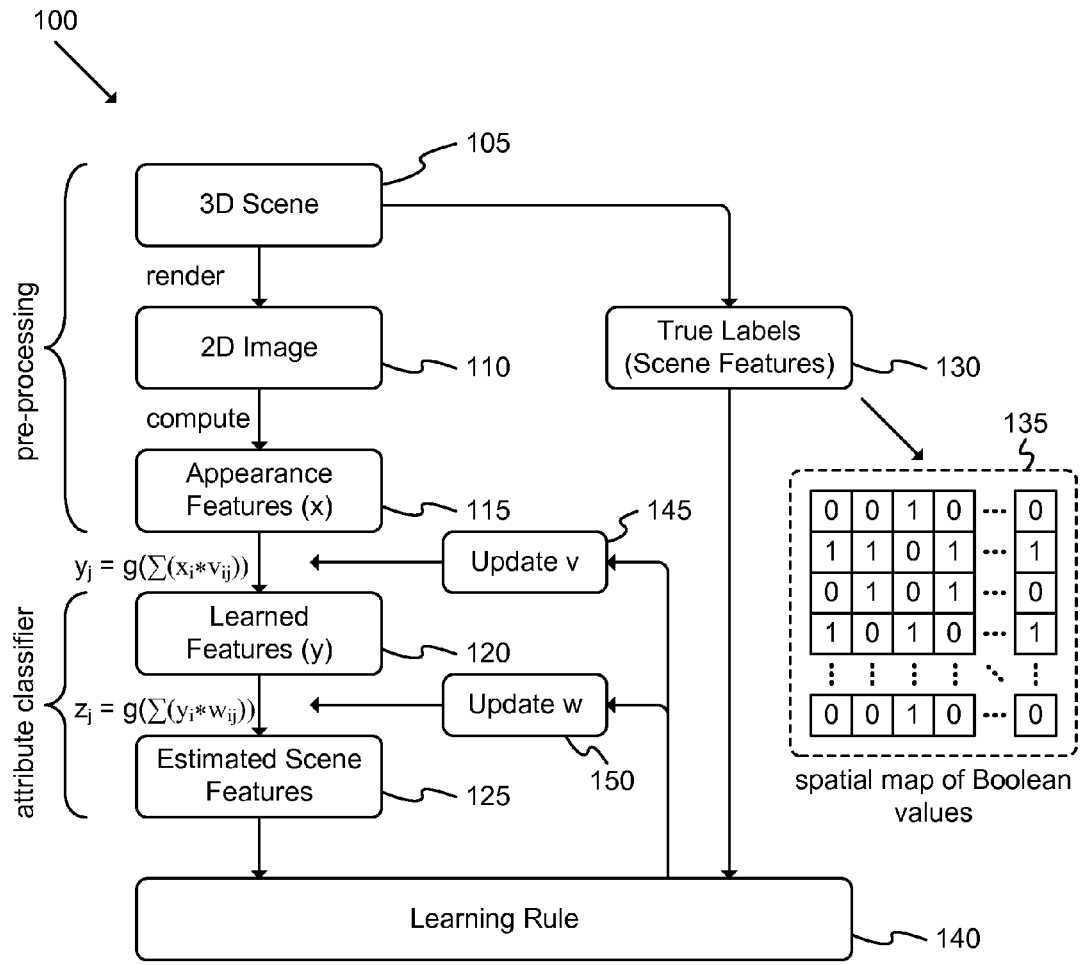
FIG. 1 illustrates a conceptual schematic block diagram of an information system according to an exemplary embodiment the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Several more detailed embodiments of the invention are described in the sections below. Section I provides a conceptual overview of the scheme implemented by some embodiments. Section II then describes conceptual systems used by some embodiments to evaluate image data. Next, Section III describes various methods of operations provided by some embodiments and provides various example implementations. Section IV then describes cost-based feature analysis used by some embodiments. Lastly, Section V describes a computer system which implements some of the embodiments of the invention.

I. Overview

Sub-section I.A provides a conceptual description of the flow of information used by some embodiments. Sub-section I.B then describes estimation of higher order features using lower level learned features. Lastly, sub-section I.C describes a learning algorithm used by some embodiments.

Some embodiments provide a way to use various inputs that may be used in subsequent labeled learning. Such inputs may include, for example, linear transforms of an image, biologically inspired transforms mimicking the front end of a mammalian visual system (including but not limited to the retina, visual thalamus, and primary visual cortex), normalization procedures such as luminance normalization, contrast normalization and other features that may be devisively normalized. A processing node within the network may represent its activation as an analog value, a binary activation state, a probability, a belief distribution, a discrete state on N possibilities, a point process over time, or any representation appropriate to the supervised learning algorithm employed.

A standard framework for generating pairs of images and associated scene features to train estimators of the scene features may be provided by some embodiments. The framework may employ pixel aligned feature maps that can easily compare the visual support in the image to the ground truth of the predicted features. The maps may include images of logical values evaluated at every spatial location. Learning samples may be chosen according to a criterion, such as matching the number of positive and negative exemplars, maintaining the relative frequency of features, etc. For this reason, not every "pixel" in an image may be used to update the learning rule. Often many of the pixels may be used to drive the context that activates the system, so that features of the context will be learned if the features help to estimate the current scene feature being trained.

A target feature sensitivity and spatial invariance may be defined by a designer using the training signal for a particular scene feature. Analog values may be encoded as a range (such as between thirty and thirty-two degrees), defined by sensitivity per feature, and tiling density of the parameter. The feature values for the learning rule may be binary, but may be deterministic or stochastic. In the later case, a range of values may by encoded by a kernal (such as a gaussian with a peak amplitude of one, or a boxcar with cosine rounded edges, etc.). The spatial invariance may be encoded by, for example, a rule that takes one of the following forms: "if at least one pixel with radius R has property X" or "if at least fraction F of the pixels within radius R have property X."

Some embodiments may provide a method for pruning the number of features in a layer of learned features. A large number of parameters may become computationally intractable if there are many scene features being estimated and large images, or large regions of neighborhood connectivity from input layers. Specifically, the higher order estimates have many inputs. Thus, the training of the input may be done on one feature at a time. Then, a greedy process may be used to add one scene feature map at a time, until asymptotic behavior is achieved. Next, a removal process may be used whereby each individual feature is removed, one at a time, with the least important feature at each step removed, until performance on the higher order classification is of asymptotic behavior. A few rounds of alternating addition and subtraction of features may be included to confirm convergence, and to estimate the error of the greedy feature selection process. The feature removal is similar to a sparseness constraint (which sets some feature weights to zero) and other sparseness methods may be used to achieve similar results. Features may be selected (and connections to the higher order estimators maintained) by virtue of the contribution of the features to performance on the scene estimation task, rather than an unknown future task.

In some embodiments, the strength of a weight change in an update rule may be scaled by a co-efficient that depends on the temporal change of a feature. Features that persist over time may have a greater or lesser weight. Greater weights at temporal boundaries emphasize learning the differences among features that may often occur close in time, but have different meaning. Additionally, the strength of a change may be scaled by a function that reflects the relative frequency of the feature according to an empirical or generative model of scenes.

A system of some embodiments may employ a network topology that includes a hidden layer between every scene estimate and an appearance layer, a higher-order scene estimate that includes inputs of many different types of first order scene estimates, and/or a spatial focus defined by a neighborhood connectivity rule across maps. Each estimated feature may have a pyramid representation over spatial scale, allowing appropriate compression for larger spatial frequencies.

In some embodiments, a neighborhood connectivity rule may define a spatial basis for sample features of another type. For example, imagine estimating whether a set of features is an eye. Based on domain expertise, a vertically oriented occluding edge (i.e., the edge of a head) may be informative for improving the estimate of the presence of an eye.

A spatial basis may tile a local region at multiple scales. Thus a low spatial frequency occluding edge would activate a laterally displaced kernal in the basis. The basis may be defined by polar coordinates, with larger regions included at larger eccentricities. In proximal regions, a spatial basis may include all local samples (locally connectivity is "all-to-all"). At larger radial distance, a single feature in the spatial basis may be the weighted average feature activity in that region. Such regions may include uniform non-overlapping sections, they may also be weighted kernals that could overlap.

A spatial neighborhood basis may be constructed mathematically or empirically. Mathematically, such a spatial neighborhood basis may be created to tile space like a dartboard by taking the product of a smoothed angular region and smoothed radial region. Empirically, such a spatial neighborhood basis may be measured directly (or a smoothed approximation or parametric representation of the basis may be generated). Such a bases may be generated by exposing the system to natural images and saving the complete history of a reference map organized into feature present and absent for a learned feature, performing an eigenvalue decomposition on the difference in the covariance matrix of the reference map between present and absent (these bases may be referred to as conditional Eigen images, as they provided a basis for discriminating whether a feature is present), and keeping only the most significant eigenvectors, while removing the rest. It may be computationally intensive to perform this analysis for each feature—thus, if the bases are similar across features, they may be treated as canonical for other feature types.

Some embodiments utilize an iterative training process whereby the system is gradually built up. First appearance features may be generated either by design convention (e.g., a collection of parameterized Gabor wavelets, Laplace transform of Gaussian functions, scene invariant feature transform (SIFT), etc.) or by learning from a database of images (i.e., applying). This stage does not require scene information. Second, scene estimators are trained by providing appearance features from locations in a scene that are appropriate for learning each scene feature. Third, higher order scene estimates are trained that have access to the ground truth of each of the "other" scene estimates. Fourth, training continues, but the specificity of the ground truth is corrupted by noise that is proportional to the error magnitude of the estimators. Fifth, training continues, but scene ground truth is replaced by scene estimates. As training continues, more and more scene estimates are used, until the algorithm has no more dependence on the scene information, and generated higher order scene estimates using nothing but the non-linear hierarchy that transforms appearance. Finally, a particular visual task is performed which has access of all of the learned features. Fine tuning may occur.

Thus, the final algorithm may be able to operate on images alone. The pairing with scenes allows learning of the mapping to scene estimates, or to discover a rich basis that is capable of extracting such information for subsequent computations.

A. Information Flow

FIG. 1 illustrates a conceptual schematic block diagram of an information system 100 according to an exemplary embodiment of the invention. Specifically, this figure illustrates various elements and data pathways that may be used to evaluate a 3D scene. As shown, the system 100 may include a 3D scene 105, a 2D image 110, a set of appearance features 115, a set of learned features 120, a set of estimated scene features 125, a set of true labels 130 associated with a spatial map of logicals 135, a learning rule 140, a parameter update at the first level 145, and a parameter update at subsequent levels 150.

The 3D scene 105 may include data related to a 3D scene. Such data may be utilized in various appropriate formats. The scene may be related to a virtual 3D environment (e.g., a gaming environment, a 3D modeled environment, a real-world environment, etc.).

The 3D scene may be rendered to provide at least one 2D image 110. Such a 2D image may include data related to the 3D scene that is presented in an appropriate format for a 2D image. A 2D image is meant to represent two physical dimensions, but may include multiple other dimensions of data (e.g., an image may include color data, and/or other such data).

The 2D image may be used to calculate a set of appearance features 115 associated with the 2D image 110 (and thus the 3D scene 105). The appearance features 115 may include various appropriate types of features (e.g., edges, wavelets, gradients, etc.). The generation of the appearance features 115 from the 3D scene 105 may be considered pre-processing that formats the data in a way that is appropriate for further evaluation.

The set of learned features 120 may be generated based on the appearance features 115 and the output "v" of the parameter update at the first level 145 (i.e., the current state of the parameter "v" based on a previous update, default condition, etc.). The set of learned features 120 may be generated at least partly based on equation (1) below, where equation (1) is one example of a forward transformation that may be used by some embodiments.

$$y_j = g(\Sigma(x_i * v_{ij})) \qquad (1)$$

In this example, "y" may be a one-dimensional vector that is calculated based on a non-linear function "g" that operates on a sum of the cross products of a one-dimensional vector "x" representing appearance features 115 and a column j of a two-dimensional vector "v" representing the weights at the first level update 145.

The learned features may include collections of co-occurring appearance features. In one embodiment, these may be collections of wavelet basis that may be used to predict the gradient of the surface normal at each location in the image. In another embodiment, the learned features may be collections of other appearance features that can predict oriented occluding edges, albedo, 3D motion, surface texture of other scene attributes, etc.

The estimated scene features 125 may be generated based on the learned features 120 and the output "w" of the parameter update at subsequent levels 150 (i.e., the current state of the parameter "w" based on a previous update, default condition, etc.). The set of estimated scene features 125 may be generated at least partly based on equation (2) below, where equation (2) is one example of a forward transformation that may be used by some embodiments.

$$z_j = g(\Sigma(y_i * w_{ij})) \qquad (2)$$

In this example, "z" may be a one-dimensional vector that is calculated based on a non-linear function "g" that operates on a sum of the cross products of vector "y", calculated above, and a column j of a two-dimensional vector "w" representing weights from the parameter update at subsequent levels 150.

In this example, each processing node within the network (the state of each of multiple nodes in features 115-125) represents its activation as a numerical value. In other embodiments each node may have a binary activation state, a probability, a belief distribution, a discrete state on N possibilities, a point process over time, or any representation appropriate to the supervised learning algorithm employed. For example, the forward transformation may increase the probability of activation of a downstream node when an upstream node is activated. In another embodiment the forward transformation may add a weighted sum of a potentially unique kernal basis function from each upstream node to determine the belief distribution of the downstream node. In another embodiment the forward transformation may map rank ordered discrete states of the upstream node to a monotonically increasing non-linear function "g". In another embodiment the forward transformation may additively or multiplicatively increase or decrease the rate of the non-homogenous point process instantiated in the downstream node. In another embodiment, the forward transformation additively or multiplicatively combines a potentially unique kernal with a matrix of the Markovian transition probabilities between all states of the downstream node.

Depending on the format that a particular system uses to represent the activation of a node, there may be different updates of the weights "v" at the first level 145, or the weights "w" at subsequent levels 160. Such updates may be performed multiple times and/or each update may include multiple weights.

In one embodiment the update rule may increase the gain or modify a parameterized shape of a kernal basis function which impacts the belief distribution of the downstream node. In another embodiment the update rule may modify the shape of the non-linear function "g", for example by shifting its slope or center or skewing the mass of a cumulative distribution function that determines a monotonically increasing non-linear function. Such a modification of the function "g" may be applied to continuous value, probabilistic, discrete or other activation state. In another embodiment, the update rule may increase or decrease the impact of the upstream node's activation on the rate of the non-homogenous point process instantiated in the downstream node. In another embodiment, the update rule modifies gain, or other parameter of a kernal which, upon activation of the upstream node, is additively or multiplicatively combined with a matrix of the Markovian transition probabilities between all states of the of the downstream node.

In some embodiments, the dimensionality of "v" and/or "w" is a matrix from each node in the upstream level to each node in the downstream level. In some embodiments, some of the entries in these matrices are zeros, and so a different representation may be used to achieve the same result. In some embodiments, there is a single value at each location in the matrix (also referred to as a "weight"). In other embodiments, there are multiple parameters at each location in the matrix "v" and "w". For example, a gain parameter (which may also be referred to as a "weight"), and additional parameters that determine the shape of a kernal, such as the mean, variance and kurtosis of a generalized Gaussian distribution, may be used to update the state of a downstream node that represents a probability distribution. In some embodiments, such an update acts upon the weight or gain parameter. In other embodiments, the update rule may act upon other parameters, such as the mean, variance, and/or other parameter of a kernal distribution, or the location, slope, and/or other parameter of non-linear activation function "g".

The set of true labels 130, associated with a spatial map of Boolean values 135, may include available labels that are associated with the 3D scene 105. The spatial map of Boolean values 135 may provide a representation of various features that may be associated with the 3D scene 105.

The learning rule 140 may include a set of evaluation criteria that may be used to compare the estimated scene features 125 to the true scene features 130 in order to generate the parameter updates at the first level 145, and the parameter updates at the subsequent levels 150. The parameter updates 145-150 may be used to update the calculations used to generate the learned features 120 and the estimated scene features 125.

Using such an information flow, some embodiments create features for a first purpose (e.g., to estimate scene properties) and then a later stage exploits the same features for use in other visual tasks. Such "features" may include appearance features, learned intermediate features, lower-order estimated features, higher-order learned features, higher-order estimated features, etc. The features may be common to many cutting-edge front end visual processing systems. "Learned features" may include a hidden layer that has no correct answer and "estimated features" may correspond to nodes in a network that are configured to represent a particular scene feature. Learned features may be non-linear combinations of appearance features. For example, the learned features may be hidden units of a three-layer neural network. As another example, the learned features may be nonlinear transforms of data associated with a support vector machine.

Some embodiments may generate appearance features and learned features during a "learning" operation. Such features may then be used at runtime to generate estimated scene properties. Such appearance features, learned features, and/or estimated scene features may then be available at runtime to perform a future unknown visual evaluation task.

One of ordinary skill in the art will recognize that although system 100 has been described with reference to various specific elements and features, the flow diagram may be implemented in various other ways without departing from the spirit of the invention. For instance, different embodiments may use various different forward transformations that may be associated with various different systems, environments, tasks, etc.

Figure 2:
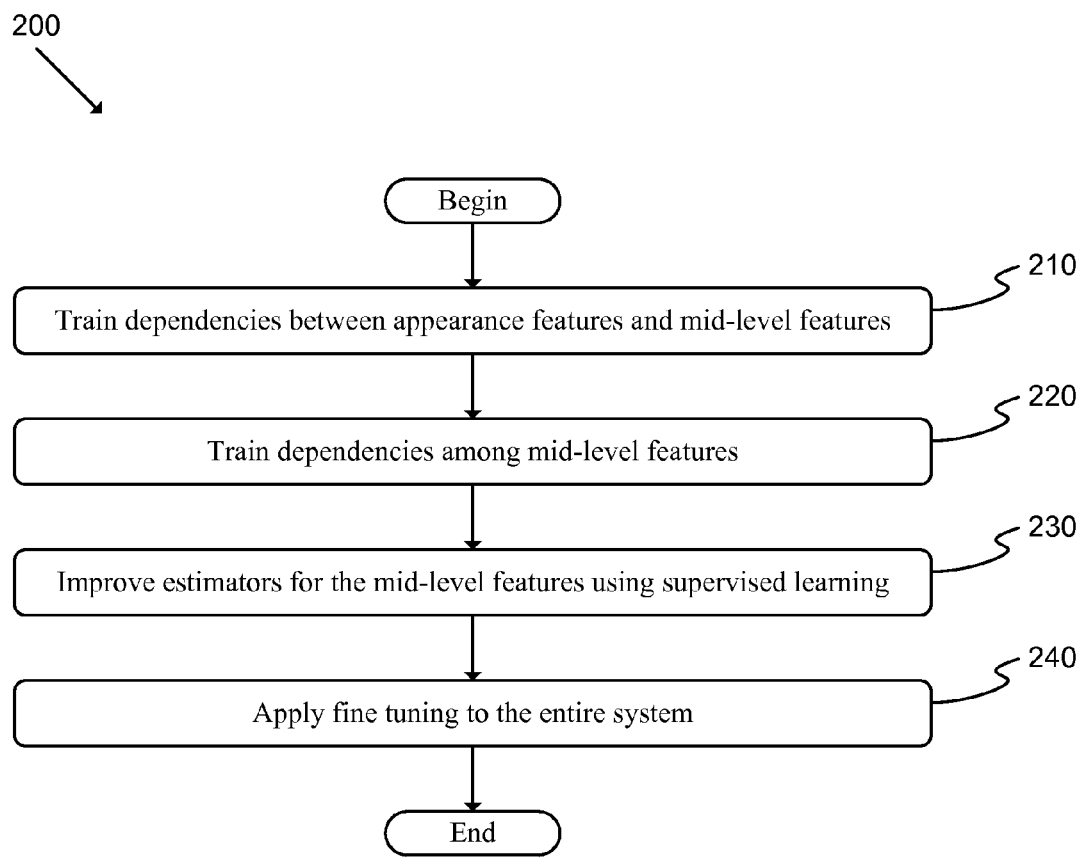
FIG. 2 illustrates a flow chart of a conceptual process used by some embodiments to implement a hybrid method that uses supervised and unsupervised learning.

FIG. 2 illustrates a flow chart of a conceptual process 200 used by some embodiments to implement a hybrid method that uses supervised and unsupervised learning. Such a process may begin, for instance, when an image is analyzed by a system of some embodiments.

As shown, the process may be used to construct an estimator of mid-level features, P(f1|ap, f2, f3 . . . fn), that estimates a spatial map of mid-level features (f1), given sparse appearance features (ap) and other mid-level features (f2, f3 . . . fn). The conditional dependencies of mid-level features may be provided by sampling from a generative model of scenes having 3D configurations with plausible objects, viewpoints and layouts. In some embodiments, the method may sample scenes from an existing computer graphics framework (e.g., a 3D animated movie, an online gaming environment, etc.). Operation 210 may require supplementary ground truth for mid-level features that are available for 3D scenes.

Process 200 may train (at 210) dependencies between appearance features and mid-level features (ap<-->f1 through ap<-->fn). The process may then train (at 220) dependencies among mid-level features (f1 to fn).

The process may then improve (at 230) estimators for the mid-level features using supervised learning. One kind of labeled data may be left out each time. Operation 240 may be applied to each kind of mid-level representation (e.g. oriented occluding edges, albedo, suffice normal, 3D motion, surface texture, etc.).

Next, the process may apply (at 240) fine tuning to the entire system and then end. Such fine tuning may include the dependencies learned from the appearance and the estimators of each of the features independently. This can be expressed as P(f1|ap, f2-hat, f3-hat . . . fn-hat), and may operate on pure image data, without requiring 3D labeled data, because each of the mid-level features is explicitly estimated.

Although process 200 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

B. Estimating Higher-Order Features

Figure 3:
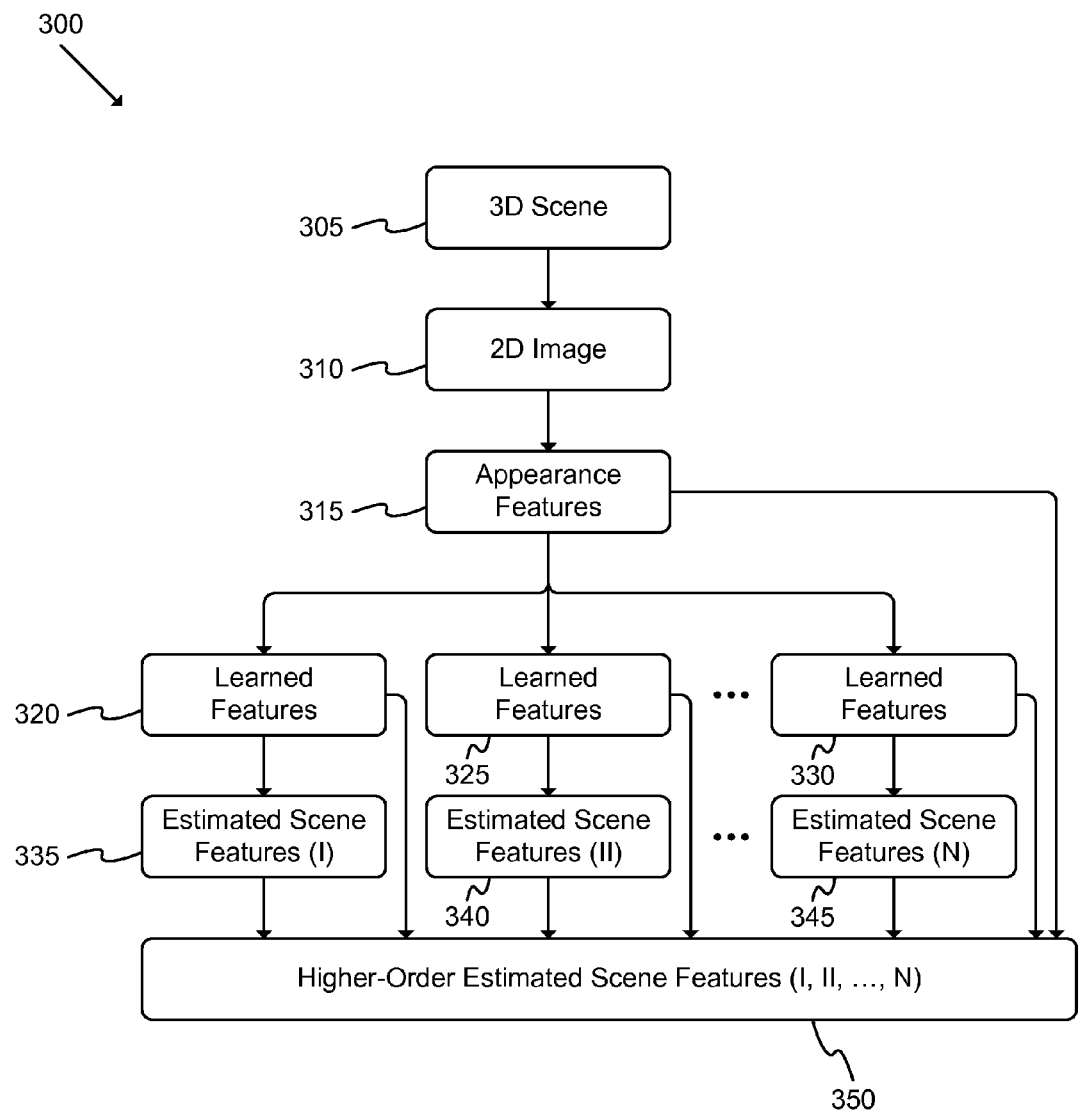
FIG. 3 illustrates a conceptual schematic block diagram of an information system that may use multiple feature types to estimate higher order features, according to an exemplary embodiment of the invention.

FIG. 3 illustrates a conceptual schematic block diagram of an information system 300 that may use multiple feature types to estimate higher order features, according to an exemplary embodiment of the invention. Specifically, this figure shows the various elements and data pathways that may be used to implement the system 300. As shown, the system may include a 3D scene 305, a 2D image 310, appearance features 315, multiple sets of learned features 320-330, multiple sets of estimated scene features 335-345, and a set of higher-order estimated scene features 350.

The 3D scene 305, 2D image 310, and appearance features 315 may be similar to those described above in reference to FIG. 1. Each set of learned features 320-330 may be similar to the learned features 120 described above. Each set of estimated scene features 335-345 may be similar to the estimated scene features 125 described above. The higher-order estimated scene features 350 may be based at least partly on the appearance features 315, one or more sets of the learned features 320-330, and/or one or more sets of the estimated scene features 335-345.

The higher order scene features 350 may be generated using various appropriate algorithms. For instance, in some embodiments the higher order scene features use the same process as estimated scene features, but they have access to other estimated scene features as input. In other embodiments, the higher order scene estimates use a different learning rule. Higher order scene features may also be a spatial array of predicted features, or a non-spatial attribute. Such higher order scene features may include, for instance, the locations of faces in an image, the linear velocity of egomotion, or the rotational velocity of egomotion.

Although system 300 has been described with reference to various specific details, one of ordinary skill in the art will recognize that the system may be implemented in various different ways without departing from the spirit of the invention. For instance, although the example system includes three sets of learned features and three associated sets of estimated scene features, different embodiments may have different numbers of sets of features that may be associated in various different ways.

Figure 4:
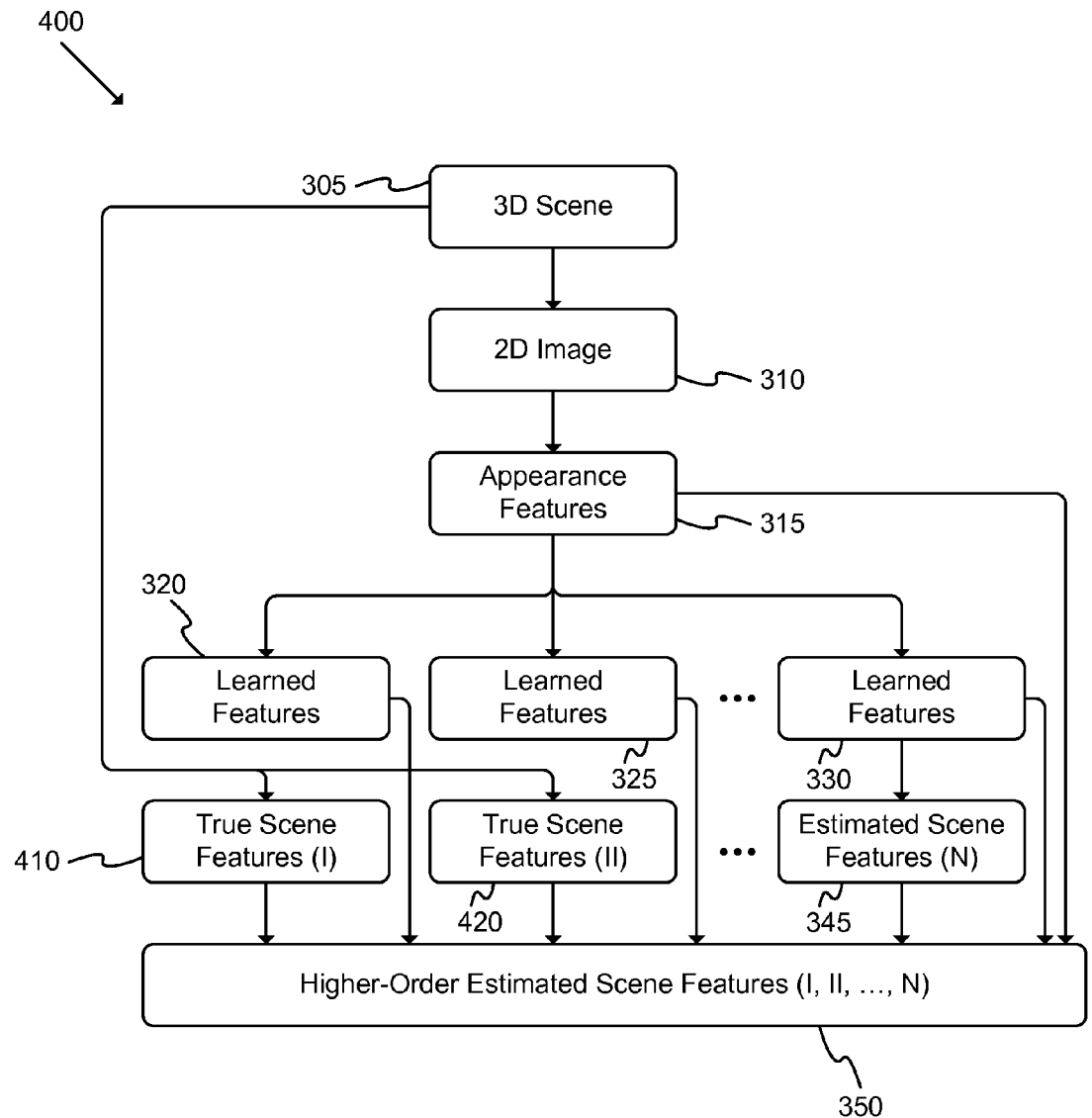
FIG. 4 illustrates a schematic block diagram of an information system that may use one or more sets of true scene features to optimize higher order estimated scene features.

FIG. 4 illustrates a schematic block diagram of an information system 400 that may use one or more sets of true scene features 410-420 to optimize higher order estimated scene features 350. System 400 may be substantially similar to the system 300 described above in reference to FIG. 3. In contrast to system 300, however, system 400 may have access to various sets of true scene features 410-420. Such true scene features may be available from the 3D scene information 305 (e.g., features of a virtual 3D environment may be available to compare to learned and/or estimated scene features).

The true scene features 410-420 may allow the estimation of higher order scene features 350 to be evaluated and/or improved. During the initial stages of training, the higher order features may be initially set to be equal to the weights between the true labels of another category and the learned category. At a later stage, the same weights will be used as a starting point, but rather than using the activity corresponding to the true features, the algorithm uses the activity of the estimated features. Such an approach maximizes the probability that the weights of the forward pass encode the true desired transform, and not a transformation from an arbitrary reoccurring biased estimate of a feature to the higher-order estimated feature.

Although the system 400 has been described with reference to various specific details, one of ordinary skill in the art will recognize that the system may be implemented in various different ways without departing from the spirit of the invention. For instance, although the example system includes two sets of true scene features, different embodiments may access different numbers of sets of true scene features (e.g., one set, three sets, ten sets, a hundred sets, a thousand sets, etc.).

Figure 5:
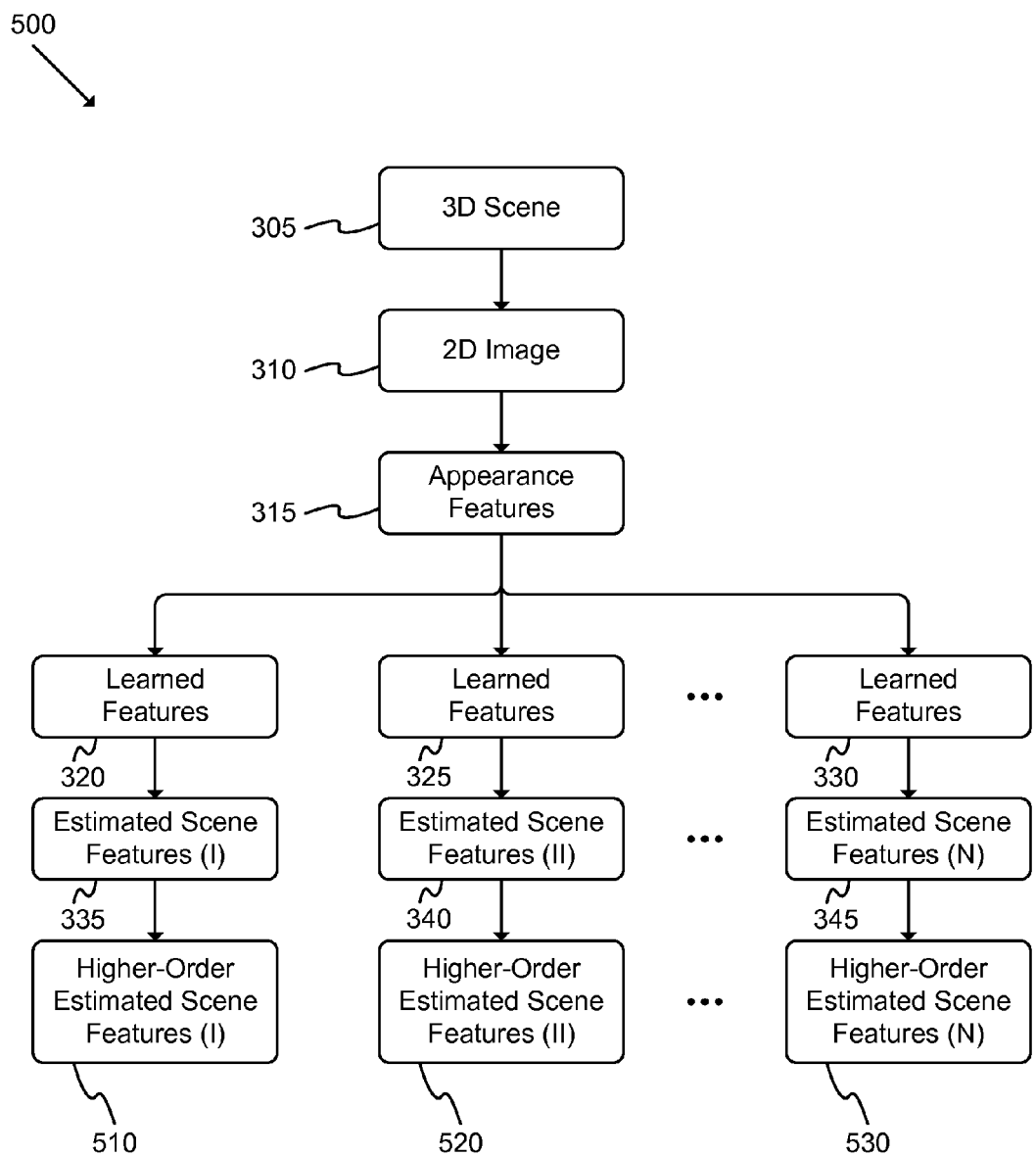
FIG. 5 illustrates a schematic block diagram of an information system that may include one or more sets of higher-order estimated scene features.

FIG. 5 illustrates a schematic block diagram of an information system 500 that may include one or more sets of higher-order estimated scene features 510-530. System 500 may be substantially similar to the systems 300-400 described above in reference to FIGS. 3-4. In contrast to those systems, however, system 500 may include multiple distinct sets of higher-order estimated scene features 510-530. Although various communications pathways have been omitted for clarity, in this example, each set of estimated scene features (e.g., set 510) may depend one or more sets of learned features 320-330, one or more sets of estimated scene features 335-345, and/or the set of appearance features 315.

In this example, the system 500 has not been optimized for any particular task, but is general purpose, able to be adapted to a variety of visual evaluation tasks. For example, such a task could be to detect forest fires, estimate flow of traffic on a freeway, estimate the density of people in a crowd, track the swim path of a whale, estimate emotional state or cognitive alertness from a facial expression, estimate the ripeness of fruit, estimate the quality of manufacturing of a product, determine the location of a threaded hole for the placement of bolt, evaluate a pipe for a leak, determine the health of an animal, assess the proper function of a mechanical system, or any other visual task that may be performed using a sufficiently high-speed, high-resolution camera having an appropriate vantage point.

Although system 500 has been described with reference to various specific details, one of ordinary skill in the art will recognize that the system may be implemented in various different ways without departing from the spirit of the invention. For instance, the number of nodes per feature type may be changed, affecting the spatial resolution of the learned features, estimated scene features, and higher-order estimated scene features. The rule for the presence of a feature may be changed, such as the radius R for inclusion. The number of feature types could vary, at any level in the system: appearance features, learned features, estimated features, and higher order estimated features. A system may have multiple levels of learned features, each with a forward transfer to the next level. The forward transfer may vary from one system to the next. The update rule may vary from one system to the next. The parameter that is updated by the update rule may vary from one system to the next. The order of training of estimated features may vary from one system to the next, for example, if the labeled features are trained in an interleaved fashion or in blocks, and the duration of the blocks.

C. Learning Algorithm

Figure 6:
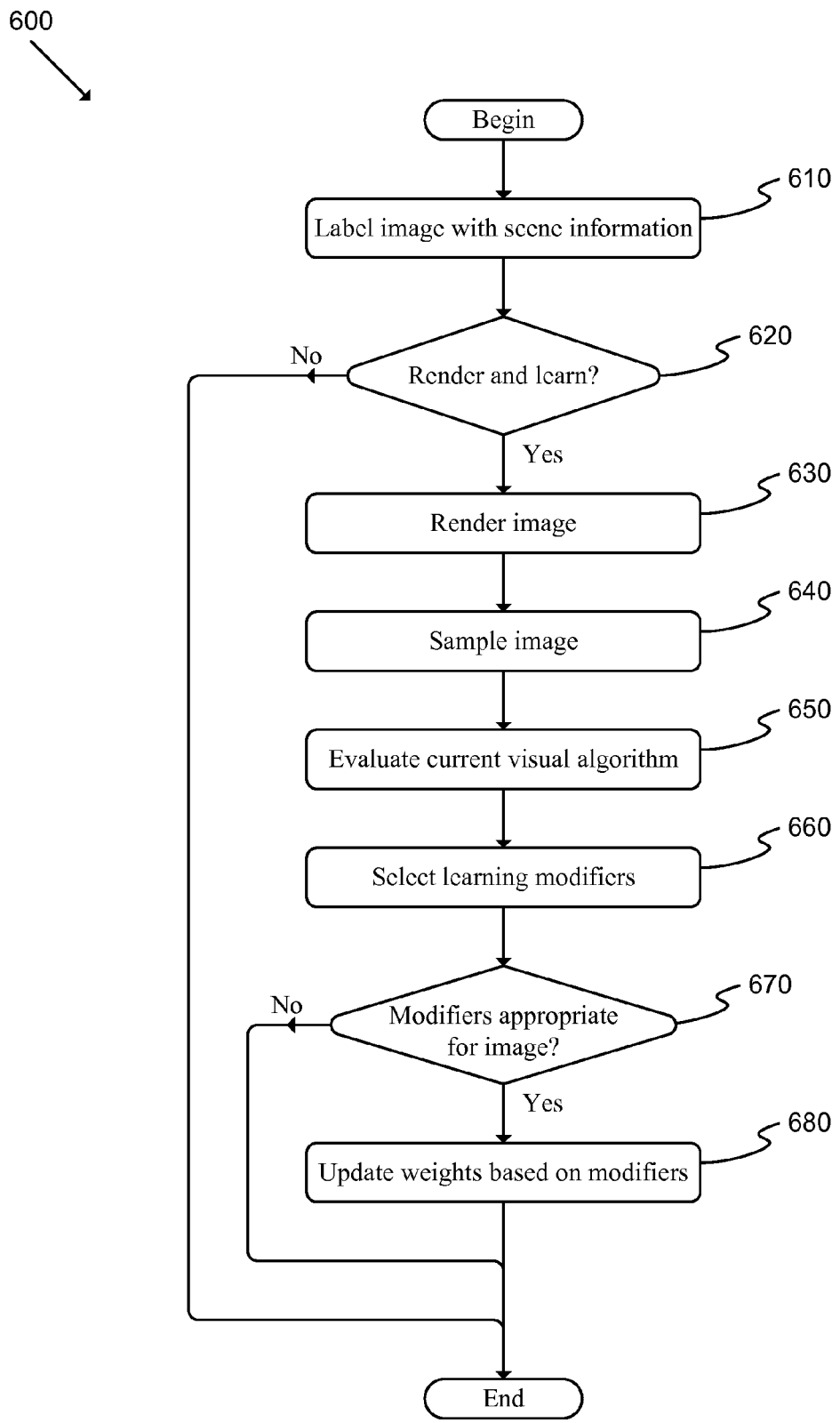
FIG. 6 illustrates a flow chart of a conceptual process used by some embodiments to estimate a variety of scene features.

FIG. 6 illustrates a flow chart of a conceptual process 600 used by some embodiments to estimate a variety of scene features. The process may be implemented, for example, using one or more of the systems 100-500 described above. Process 600 may begin each time an image is made available for analysis. The process may be executed iteratively for a set of associated images (e.g., frames of a video). Alternately the process may be executed on a queue of scenes and images that were selected based on some rule. For instance, image-scene pairs could be collected from, for example, a world state for every $i^{th}$ player and $n^{th}$ second from a virtual world, a generative model of objects, layouts, and/or viewpoints, random viewpoints from a client global positioning system (GPS) rendered in various appropriate ways, a view of an object from 3D library with a spherical background and illumination map, etc.

Next, process 600 may label (at 610) the image with scene information. Each item of scene information may be calculated per pixel (and/or other appropriate delineations). The calculated scene information may include, for instance, whether the pixel is an occluding edge, whether an orientation is within a set of thresholds, whether a smoothed first, second, or third derivative of a surface is within a set of thresholds, whether a surface normal is within a set of thresholds, whether a coefficient (e.g., a Zernike coefficient) of a local surface is within a set of thresholds, whether an incident illumination is within a set of thresholds, a property of a surface texture label (e.g., whether the label is hair, brick, skin, fabric, etc.), a common type of element (e.g., a lip, eye, door, agent, power outlet, etc.), whether an effective color in white light is within a set of thresholds, etc. Generally, the scene information may include a function based on scene properties, camera positions, pixel location, etc.

Process 600 may then determine (at 620) whether the image is appropriate to render and learn. Such a determination may be made in various appropriate ways. For instance, such a determination may be made at least partly based on an applied sufficiency function, being rejected if the image (or portion of an image being analyzed) includes insufficient data (e.g., due to a lack of a positive example in view of scene, attempting to analyze a region too close to the edge of image, etc.). As another example, a positive feature example according to an evaluation function may be selected. Such an evaluation function may have a particular threshold (or set of thresholds) and may be chosen statically or dynamically (e.g., based on each feature to reflect a prior probability based on a logical operator and one or more data sources, where such relative probabilities of features may be maintained and/or reflected in updates).

In general, the training of frequently occurring features may take a long time, because there may be a large number of such features. Thus, some systems may update the entire system for only a subset of the total occurrences of a feature, but shift the magnitude of the update accordingly. The selection of the subset, both the identity and the fraction of the total set may vary from one system to another, because any computational speedup may come at the cost of unnecessarily emphasizing spurious correlations.

When the process determines (at 620) that the image is not appropriate, the process may end (or may return to operation 610 after retrieving the next image in a set of images being analyzed). Alternatively, when the process determines (at 620) that the image is appropriate, the process then renders (at 630) the image. In some embodiments, the renderer may be selected dynamically (e.g., based on a learning state). For instance, in some embodiments, a fast renderer may be selected when the number of iterations is less than a pre-training threshold, and/or when a learning state exceeds a threshold. Otherwise, a slow renderer may be used.

Alternatively to labeling and rendering an image as described above, process 600 may label images with scene attributes. Performing a large number of training samples may require an automated process. Such a process may be at least partially achieved by crowd sourcing a labeling task rather than rendering the image.

Process 600 may then sample (at 640) the image. Such sampling may be performed multiple times, where a set of operations is performed for each sample. Each sample may be evaluated to determine, for instance, a center context over a selected pixel (defined as an "attended pixel"), defining first scene and image identifiers, and transforming the image by updating a 3D scene.

The samples may be used to identify, for instance, ego motion (e.g., moving forward, veering right, rotating head, etc.), agent motion (e.g., moving body, driving car, talking head, etc.), scale (zoom to or recede from approach), etc. In addition the samples may be used to translate (e.g., a Gaussian jitter of view angle with pre-defined variance thresholds), apply an advanced physics engine (e.g., falling objects, rising smoke, etc.), etc.

The image may be rendered after the transform and defined using second scene and image identifiers. Some embodiments may store the samples in a database as labeled experiences that are available for batch learning.

Next, the process may evaluate (at 650) the image using a current visual algorithm. The evaluation may be performed using the visual algorithm on the first and second identified images. Results of the evaluation may include, for instance, a response of an estimator for the current feature, response of the estimator for other features, response based on appearance features, etc.

Process 600 may then select (at 660) learning modifiers. Various scenarios may occur depending on whether mid-level feature at a location are the same or different between the first and second identified images. The location may include a region centered at each sampled pixel in the first identified image. The region may have a spatial tolerance equivalent to, for instance, a particular radius. Because each scenario includes two images, there are four possible image contexts in which the learning algorithm may update. The system may update based on the activation in response to the first image and the second image. Thus, a vector of eight values may be used to encode two changes for each image pair. One change may be based on a combination of the response to the first image and one value in the vector, and another change may be based on the combination of the response to the second image and another value in the vector.

Table 1 below presents an example comparison matrix between a first image (Image 1) and a second image (Image 2). The first image and the second image may, in some cases, be consecutive frames in a video. Alternately, the second image may be a frame that is located multiple frames (e.g., 3, 5, 10, 20, 100, 1000, etc.) after the first image. As another alternative, the combination of the response to the first image and the second image may be a combination of the average response to a first number of frames "N: and the average response to a second number of frames "M", occurring a number of frames "T" later. As yet another alternative, the combination may be a weighted average of the response to N frames combined with a different weighted average of the response to M frames, separated by T frames.

TABLE 1

|  |  | Image 1 | |
| --- | --- | --- | --- |
|  |  | POS | NEG |
| Image 2 | POS | persist | appear |
|  | NEG | disappear | absent |

An update strength parameter may be calculated by multiplying a learning rate value by a matrix of values based on the results of the comparison illustrated by Table 1. Such a matrix, or contextual gain vector, may be represented as [persist1 persist2 appear1 appear2 . . . disappear1 disappear2 absent1 absent2]. As one example, learning may be based purely on a label, where an example matrix may include values [1 1 −1 1 1 −1 −1 −1]. As another example, learning at a temporal boundary may be emphasized, where an example matrix may include values [1 1 −2 2 2 −2 −1 −1]. As yet another example, learning may only occur at temporal boundaries, where an example matrix may include values [0 0 −1 1 1 −1 0 0]. As still another example, learning may avoid temporal boundaries, where an example matrix may include values [1 1 0 0 0 0 −1 −1].

Persist, appear, disappear, and absent values may be set for a particular feature. In some cases, the values may be hand designed by an expert for each selected dense label type. Many dense labels may be effectively learned using a small set of possible eight-long update vectors. In other cases, values may be selected from a list of commonly used contextual gain vectors. In other cases, a particular vector may be generated from first principle to achieve a certain ratio of emphasis on persisting features vs. fluctuating features, or to allow the weights to some features to slowly fade during long epochs of absent labels.

The matrix values may be any scalar number. The examples above were chosen for simplicity and to indicate larger values vs. smaller values, and where certain relationships are exactly balanced in magnitude but reversed in sign.

The learning rate value may have a larger magnitude initially, and then decrease as training progresses. Such an approach is similar to "simulated annealing." The initial value of the learning rate may have a different characteristic scale depending on the parameter being updated.

Each node has a label that was either 0 or 1 for each image, and different actions should occur based on the values. One example update may be implemented as follows: "00" w=w+[response1−mean(response1)]*learning_rate*absent1+[response2−mean(response2)]*learning_rate*absent2; "01" w=w+[response1−mean(response1)]*learning_rate*appear1+[response2−mean(response2)]*learning_rate*appear2; "10" w=w+[response1−mean(response1)]*learning_rate*disappear1+[response2−mean(response2)]*learning_rate*disappear2; and "11" w=w+[response1−mean(response1)]*learning_rate*persist1+[response2−mean(response2)]*learning_rate*persist2.

More generally, each new weight may be written as a function of the factors that affect the weight. The factors could be combined in various different ways. For instance, w=f (w, learning_rate, response1, response2, mean(response1), mean(response2), contextual_gain1, contextual_gain2). Labels may also be passed when appropriate, if they include real values (as opposed to the Boolean values described in reference to FIG. 1.) For instance, w=f (w, learning_rate, response1, response2, label1, label2, contextual_gain1, contextual_gain2).

Process 600 may then determine (at 670) whether the selected learning modifiers are appropriate for the current image. Such a determination may depend on various appropriate factors, such as the resolution of the image, content of the image, color space of the image, etc. When the process determines (at 670) that the selected learning modifiers are not appropriate, the process may end. Alternatively, the process may update (at 680) various weights to be used in evaluating images.

The weights may be updated (at 680) in various appropriate ways based on various appropriate factors (e.g., whether using online learning or batch learning). The weights may be updated at either one or two locations (for instance, equations (1) and (2) described above). All algorithms may update the weights based at least partly on the learned features as related to estimated scene labels. This is effectively fitting a hyperplane. Back-propagating the error in a neural network (ANN) allows the system to update the weights of the layer below: the connection from appearance features to learned features. Other machine learning algorithms (e.g., adaptive boosting, reinforcement learning, genetic algorithms, etc.) may either use standard feature sets (e.g., for support vector machines) or may use random local features or the identity function of the previous level.

Although process 600 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

II. System Architecture

Sub-section II.A provides a conceptual description of a system architecture used by some embodiments to optimize local evaluation of image information. Sub-section II.B then describes an alternative system architecture that may optimize distributed evaluation of image information.

Some embodiments include a client device (e.g., a mobile phone, a camera, etc.) and a server device that may be accessible over one or more networks. During operation, the client device may send information to the server related to an image under evaluation. The server may send one or more task-specific "expert" modules to the client device for execution and/or execute such expert modules and return data to the client device.

In one example situation, a client device may capture one or more images of a flying bird. The server may identify expert modules that are related to things like flying birds (e.g., other flying objects, other moving animals, etc.). The expert modules may be dedicated to a current evaluation task (e.g., following the flight path of a bird and keeping the camera in focus) and may be based at least partly on image data (and/or other data) sent to the server.

A. Local Implementation

Figure 7:
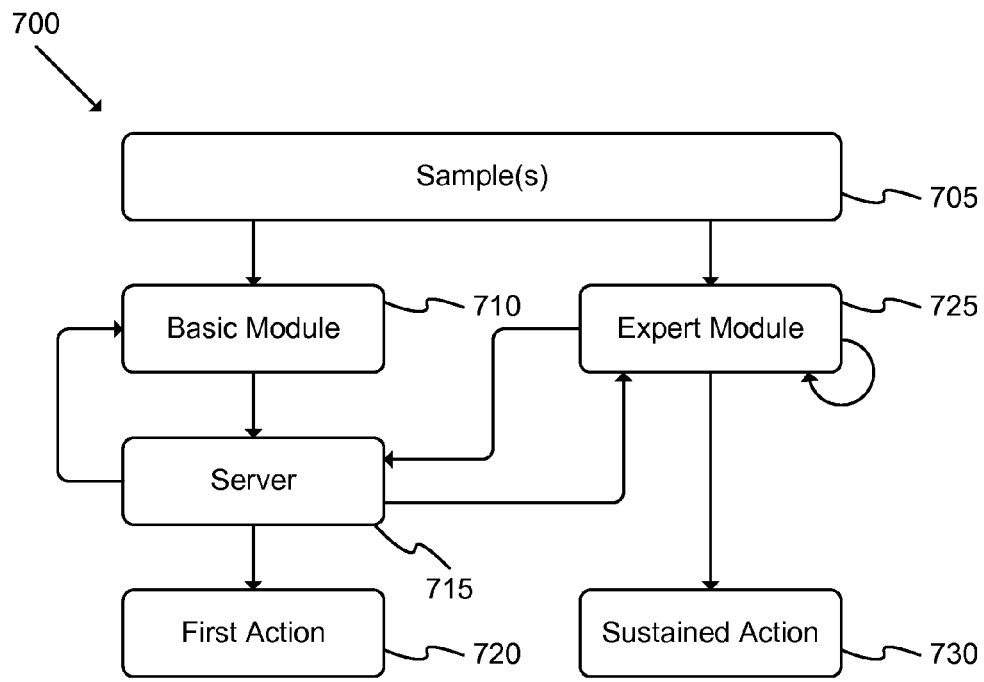
FIG. 7 illustrates a schematic block diagram of a conceptual system used to implement some embodiments of the invention.

FIG. 7 illustrates a schematic block diagram of a conceptual system 700 used to implement some embodiments of the invention. Such a system may be implemented on a client device that has minimal interactions with a server device so as to provide fast response time. As shown, the system may include a set of accessible samples 705, a basic module 710, a server 715, a first action 720, an expert module 725, and/or a sustained action 730.

Each sample in the set of accessible samples 705 may be retrieved from an accessible database and/or other appropriate storage element. Such a sample may include visual information related to an image.

The basic module 710 may receive one or more samples for evaluation. Data related to each received sample may be sent to the server 715 for evaluation. The server may return information to the basic module of the client device (e.g., an answer, categories and associated confidences, specialist information, etc.). The server may thus implement a first action 720 based on the received sample(s). The server may supply one or more expert modules 725 to the client device based at least partly on the information received from the client device. Once sent to the client device, each expert module may operate on additional samples to provide sustained actions 730 based at least partly on the received samples 705.

Although system 700 has been described with reference to various specific details, one of ordinary skill in the art will recognize that the system may be implemented in various different ways without departing from the spirit of the invention. For instance, different embodiments may have different numbers of modules that may include various different communication pathways.

B. Distributed Implementation

Figure 8:
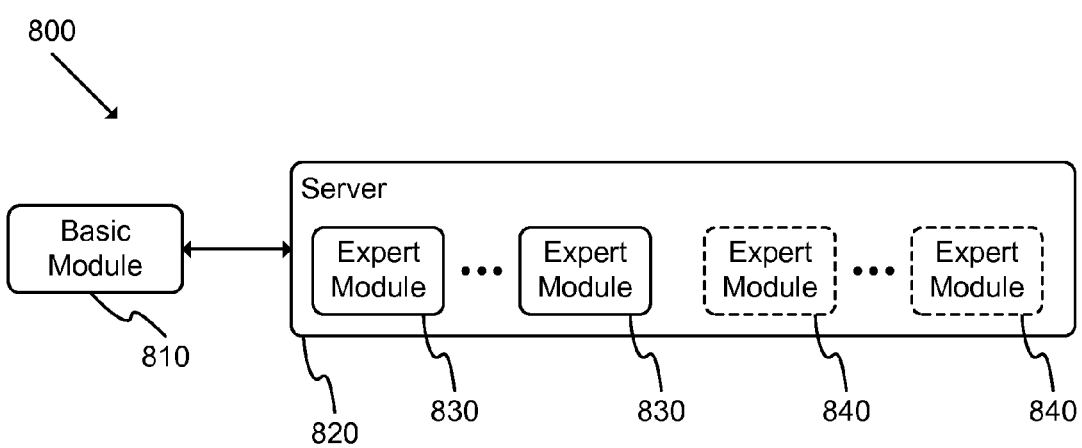
FIG. 8 illustrates a schematic block diagram of an alternative conceptual system used to implement some embodiments of the invention.

FIG. 8 illustrates a schematic block diagram of an alternative conceptual system 800 used to implement some embodiments of the invention. As shown, the system may include a basic module 810 which may be implemented on a client device (e.g., a mobile phone, a camera, a PC, etc.) and a server 820 with access to sets of expert modules 830-840. In this example, the server executes the expert modules rather than sending the modules to the client for execution.

In some embodiments, only a sub-set 830 of the available expert modules is running at any given time, while another sub-set 840 may be unused in order to save processing power.

Although system 800 has been described with reference to various specific details, one of ordinary skill in the art will recognize that the system may be implemented in various different ways without departing from the spirit of the invention.

III. Methods of Operation

Sub-section III.A provides a conceptual description of the generation of object-invariant representations used by some embodiments. Sub-section III.B then describes multiple variable evaluation used by some embodiments. Next, sub-section III.C describes evaluation of sequential images performed by some embodiments. Sub-section III.D then describes prediction of subsequent image information provided by some embodiments. Next, sub-section III.E describes dense feature collection provided by some embodiments. Sub-section III.F then describes grouping by some embodiments of multiple features. Lastly, sub-section III.G describes grouping of transformation to predict subsequent image information in some embodiments.

A. Object Invariant Representation

Figure 9:
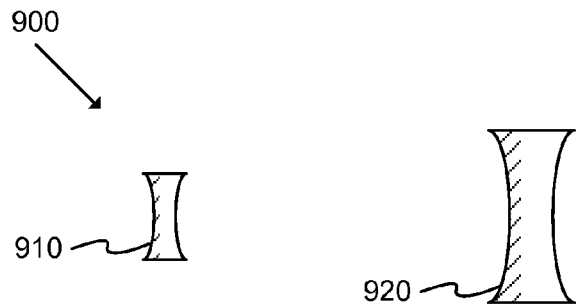
FIG. 9 illustrates a side view of an object with a first set of visual properties and another object with a second set of visual properties.

FIG. 9 illustrates a side view of an object 910 with a first set of visual properties and another object 920 with a second set of visual properties. In this example, the objects 910-920 may be similarly-shaped object of different sizes (or different distance to a camera) and/or may be otherwise related. The objects are shown as examples only and one of ordinary skill in the art will recognize that various differently shaped, sized, and/or otherwise differentiated objects may be evaluated in a similar fashion to that described below.

Figure 10:
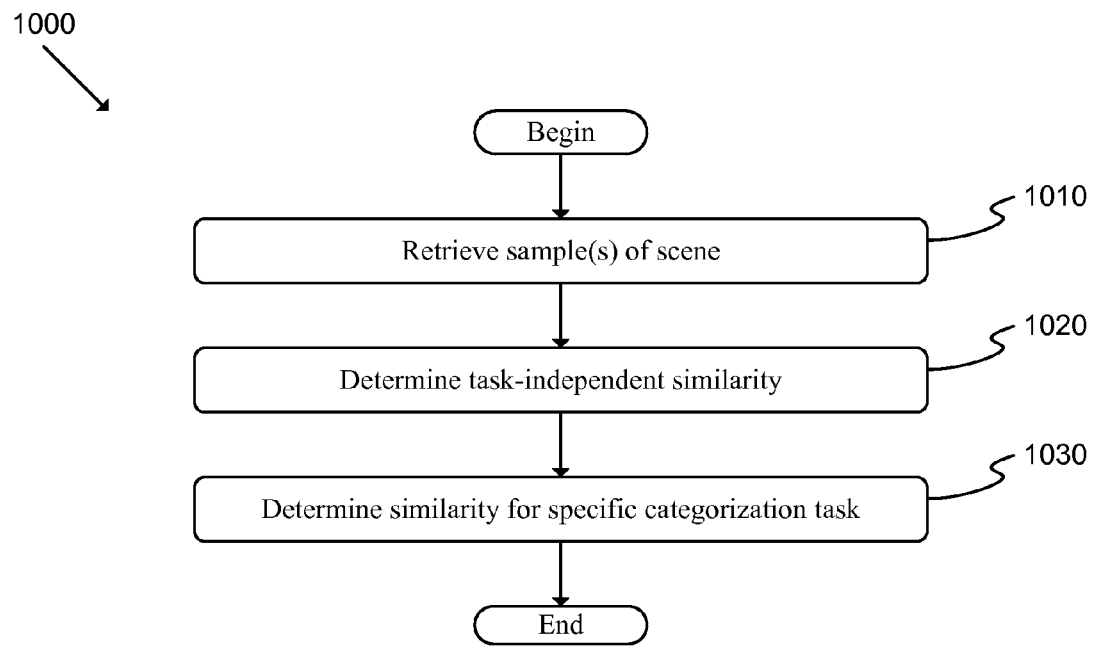
FIG. 10 illustrates a flow chart of a conceptual process used by some embodiments to provide object invariant representations of objects.

FIG. 10 illustrates a flow chart of a conceptual process 1000 used by some embodiments to provide object invariant representations of objects. Process 1000 will be described with reference to FIG. 9. Process 1000 may begin, for instance, when a scene is being evaluated by some embodiments.

Next, the process may retrieve (at 1010) a set of samples of the scene. Each of such samples may include a set of pixels included in an image associated with the scene under evaluation. The sets of pixels may be of varying size and shape. Each sample may include the same size and shape of sets of pixels such that the samples may be compared to similar other samples and/or evaluation criteria.

The process may then determine (at 1020) task-independent similarity of two or more samples. Next, the process may determine (at 1030) similarity of two or more samples for a specific categorization task. The process may then end.

Such determinations may be based at least partly on various visual features associated with images under evaluation. For instance, the object 910 may have a similar ratio of space to shadow as the object 920. As another example, the two objects 910-920 may have a similar edge curvature of a particular edge, similar ratio of height to width, and/or other similarities that may associate the objects.

Although process 1000 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

B. Multiple Variable Evaluation

Figure 11:
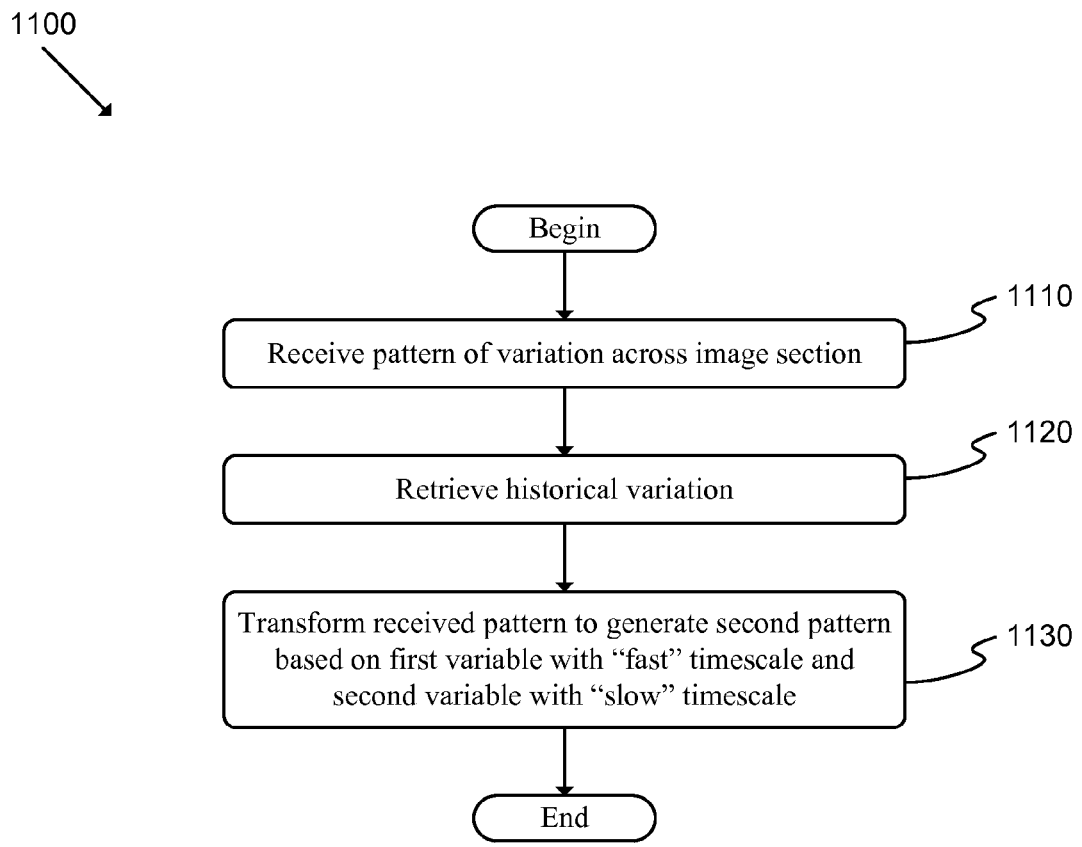
FIG. 11 illustrates a flow chart of a conceptual process used by some embodiments to evaluate multiple variables.

FIG. 11 illustrates a flow chart of a conceptual process 1100 used by some embodiments to evaluate multiple variables. Such a process may begin, for instance, when an image is evaluated by some embodiments. The process may be used to identify associated sections of visual information (e.g., visual information associated with a banana viewed during the day and at night).

Next, the process may receive (at 1110) a pattern of variation across a section of the image. The process may then retrieve (at 1120) historical variation in a measured variable. Such a measure variable may decline exponentially over time (e.g., a magnitude associated with the variable may rise rapidly and then decay over time following an exponential decay path). The process may then transform (at 130) the received pattern to generate a second pattern based on a first variable with a fast timescale and a second variable with a slow timescale (e.g., a variable with exponential decay).

Although process 1100 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

C. Sequential Image Evaluation

Figure 12:
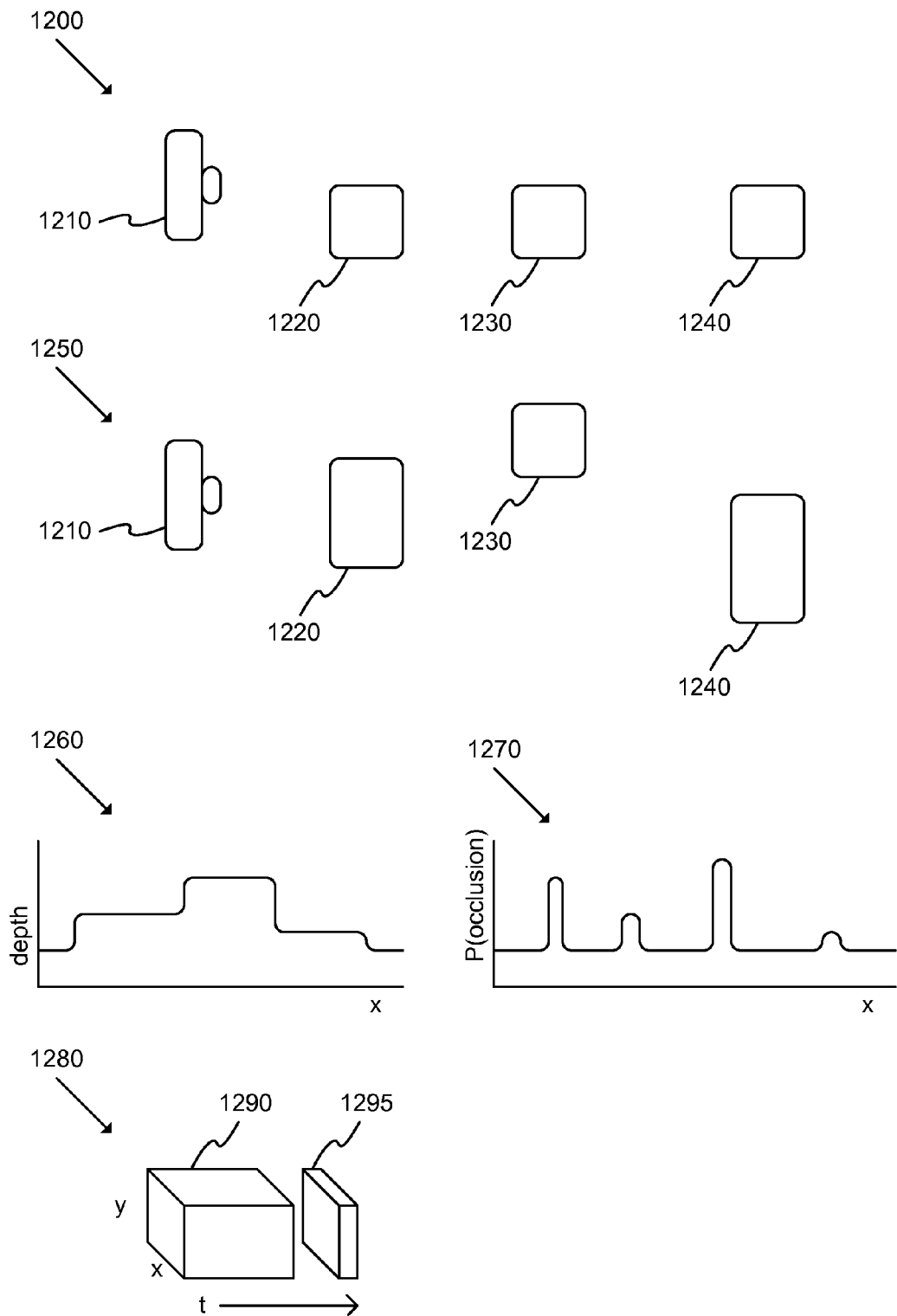
FIG. 12 illustrates a side view and a top view of an example object layout within a scene, an x-y plot of a cross section of a depth image, an x-y plot of a cross section of an estimate of the probability of an occluding edge, and a 3D plot of a timeline.

FIG. 12 illustrates a side view 1200 and a top view 1250 of an example object layout within a scene, an x-y plot of a cross section of a depth image 1260, an x-y plot of a cross section of an estimate of the probability of an occluding edge 1270, and a 3D plot of a timeline 1280. As shown, the side view 1200 includes a camera 1210, and several objects 1220-1240 arranged within the view 1200. The top view 1250 includes the camera 1210 and objects 1220-1240 as seen from the alternative viewpoint.

The x-y plot of a cross section of a depth image 1260 indicates the relative depths of the objects 1220-1240 as rising edges along the depth axis, where the x axis represents a horizontal position along the views 1200 and 1250. The x-y plot of a cross section of an estimate of the probability of an occluding edge 1270 indicates the estimated probability of occlusion on the vertical axis and the horizontal position along the views 1200 and 1250 along the x axis.

The 3D plot of a timeline 1280 indicates a short video 1290 being recorded and an image 1295 being taken. Such a short video may allow for analysis of images taken from multiple viewpoints (i.e., with a moving camera). Alternatively and/or conjunctively, the short video may allow analysis of movement of objects with a fixed camera position (e.g., showing coherent motion such as an object travelling at a constant velocity, jitter around one or more objects, etc.).

The parallax in the scene will result in some of the background being occluded on one side of a foreground object, and revealed on the other. Typically this is on the left or right side due to horizontal translation of the relative position of the camera and the foreground object, but it may be caused by relative motion in any direction. Object rotations may also cause the appearance and disappearance of visual features.

A generalization of the appearance or disappearance of visual features is a change from one pattern to the next, after accounting for global distortions of translation, expansion, rotation, shear, or other geometric transformations that may be caused by egomotion or other global movements. This pattern change is indicative of a moving boundary of an object, and hence provides a probabilistic cue of an edge of an object. Alternatively or additionally the changes caused by occlusion may be detected by violations in the conservation of some resource that is typically conserved, such as luminance.

Generally, the pattern is more reliable, but in some cases unaccounted for luminance changes may be enough. In one method, the probability of an object edge could be modeled as a Boltzman distribution where the energy is set to a score of the pattern change, or luminance change, or some other change. After accounting for egomotion or other global motion, the Boltzman constant may be determined by the magnitude of the score process, and the temperature may be determined by the context. The score, the probability, or a threshold on either could be used as the dense label. Before passing on the labels for learning, some algorithms may benefit by a de-noising process that exploits the prior probability of the continuity of object boundaries.

The general strategy is to create an engineered solution for extracting a particular label, and providing this a training signal that acts on the raw data. The system may be able to perform the same operation more efficiently. Also the signal will be more compatible across domains, allowing the system to combine the signal with many other learned dense labels for general-purpose tasks. Compared to a 3D world a processed label from a camera may be less reliable, but the image data is more realistic. Also images from cameras are likely to be easy to tailor to a particular problem domain (which may not necessarily provide inputs in a 3D world) including the lighting, noise level, resolution, auto-focusing, auto-white-balancing, or other camera settings that are appropriate for the problem domain.

Although the example of FIG. 12 has been described with reference to various details, one of ordinary skill in the art will recognize that different specific examples may include different numbers of objects, different layouts of objects, different depth and/or probability calculations, etc.

Figure 13:
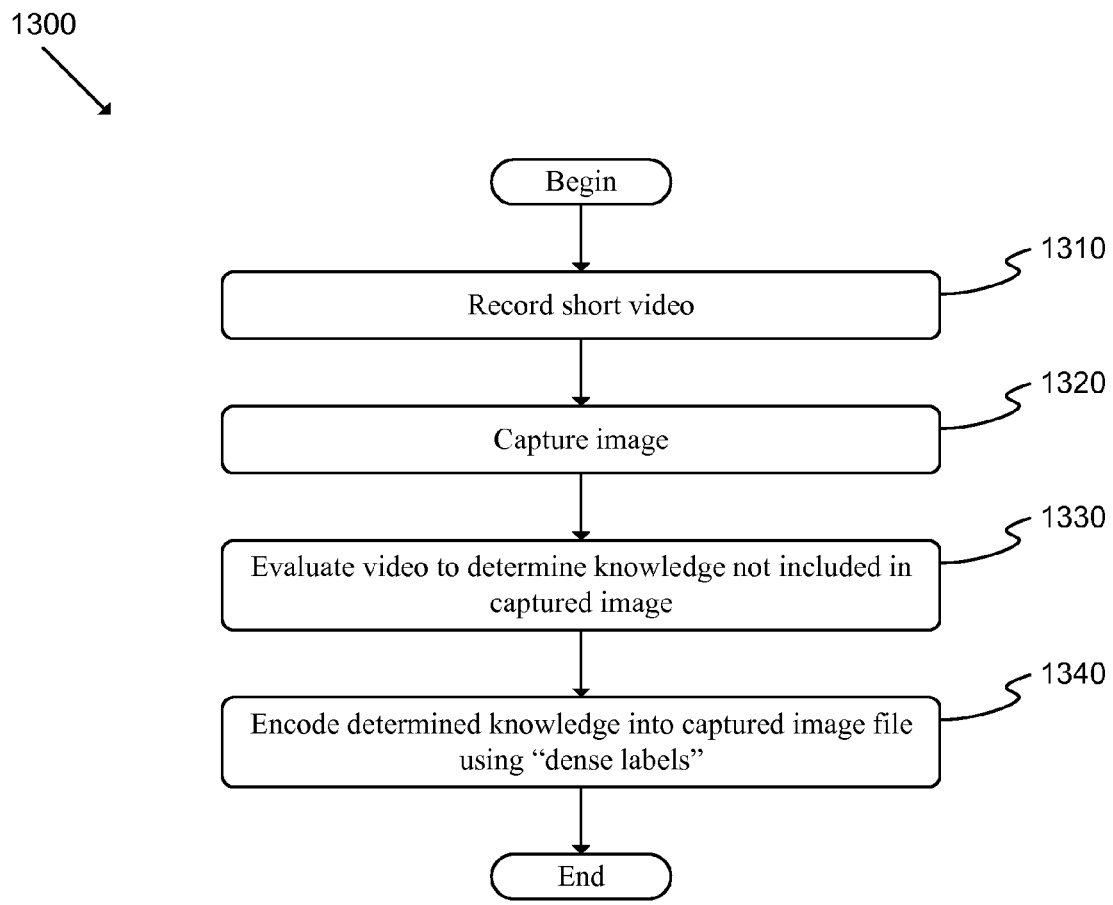
FIG. 13 illustrates a flow chart of a conceptual process used by some embodiments to append dense labels to an image.

FIG. 13 illustrates a flow chart of a conceptual process 1300 used by some embodiments to append dense labels to an image. Process 1300 will be described with reference to the example of FIG. 12.

As shown, the process may record (at 1310) a short video (e.g., video 1290) that includes a sequence of images. Next, the process may capture (at 1320) am image. Such an image may be captured in various appropriate ways.

The process may then evaluate (at 1330 the recorded video to determine knowledge that is not included in the captured image. Such knowledge may include, for instance, depth of objects 1260, probability of occlusion 1270, etc. Thus, for example, although an object in the captured image may be represented at a fixed position with no movement, movement of the object may be detected by analyzing the video.

Next, process 1300 may encode (at 1340) any determined knowledge into the captured image file using dense labels. Such encoding may utilize a structure similar to the image file representation (e.g., RGB) that may be transparent to external systems but include information determined by examining the recorded video, for instance. Such encoded information may be used in various appropriate ways (e.g., to predict the path of an object, to determine relative positions of a set of objects, etc.).

Although process 1300 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

D. Prediction of Subsequent Image Information

Figure 14:
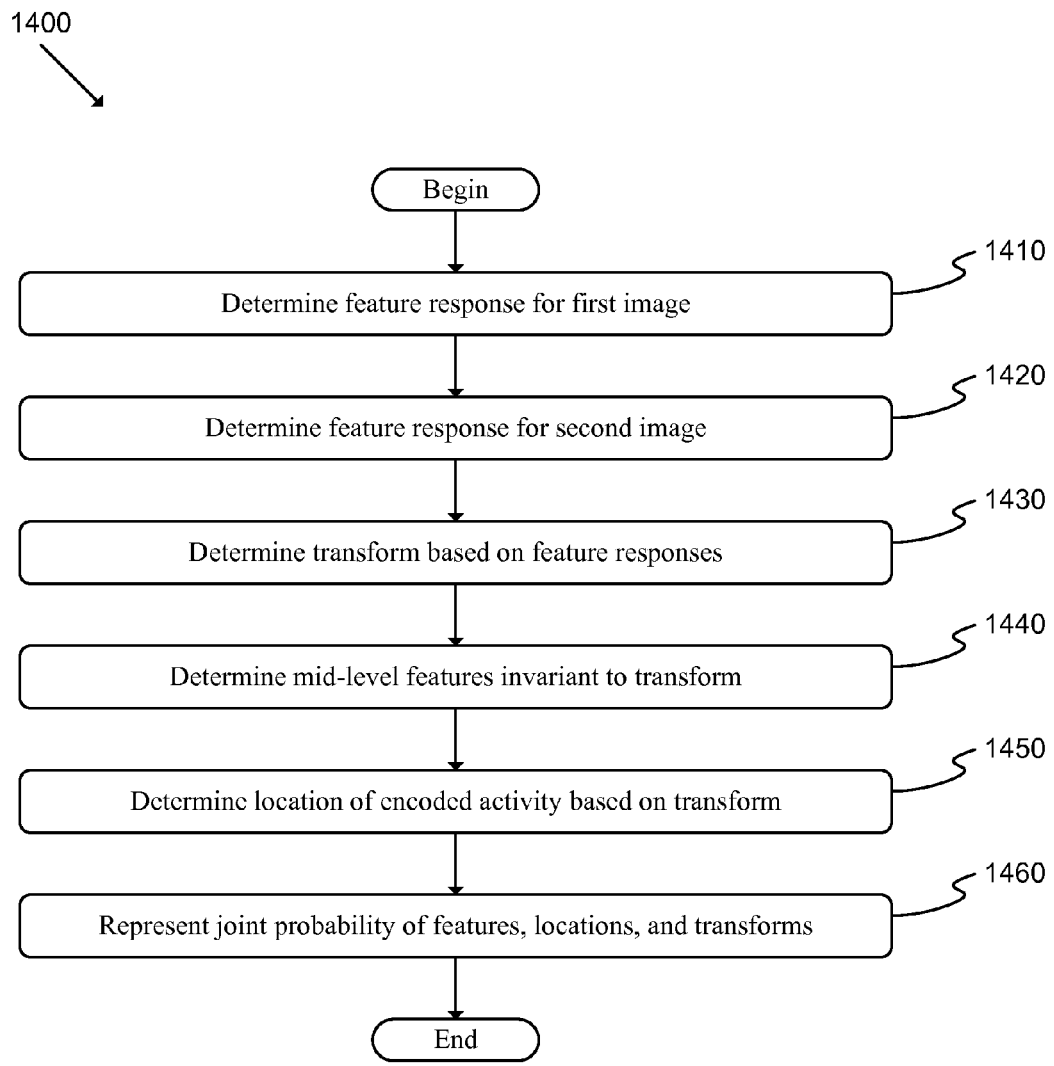
FIG. 14 illustrates a flow chart of a conceptual process used by some embodiments to estimate the joint probability of features and transforms.

FIG. 14 illustrates a flow chart of a conceptual process 1400 used by some embodiments to estimate the joint probability of features and transforms. Such a process may begin, for instance, when a set of images is made available for evaluation. As shown, the process may determine (at 1410) a feature response for a first image. Next, the process may determine (at 1420) a feature response for a second image. The process may then determine (at 1430) a transform based at least partly on the feature responses of the first and second image. Next, process 1400 may determine (at 1440) mid-level features that are invariant to the transform. The process may then determine (at 1450) a space of encoded activity based on the transform. Lastly, process 1400 may represent (at 1460) joint probability of the transform and the space and then end.

As one example, some embodiments may analyze a set of features to determine that a sequence of images includes a rotating wheel. The transform may then be based at least partly on the speed of the wheel, while the space may include units that will represent a future image (if the speed is maintained).

To continue this example, the first image may induce a feature to strongly respond to a grommet on the edge of the rotating wheel. In the response of the second image, the grommet will induce a new feature to respond in a different location. In this case, a single grommet was displaced, and this may be consistent with a translation or rotation. So after the second image, there remains some ambiguity. However, if multiple grommets respond, the system may find a transformation consistent with the pair of responses is a rotation about the axis of the wheel.

Such transforms are presumed to last for longer than two consecutive frames and so the evidence gained from previous frames can be integrated to better predict the current transform, and thus better predict the next location of the grommet on the wheel. Thus, even if there was some ambiguity about a rotation or translation on the second frame, at the next sample, the transform estimation may combine its current state, which contains historical information, with the new evidence.

Additionally the knowledge of the location of the feature (or collection of features) may help to identify that it is, in fact, the same grommet that is moving around, as opposed to randomly appearing and disappearing grommets.

Since the system is not perfect, and may make mistakes, it may not produce a confident answer if the evidence is weak. It will however still indicate that some states are more likely than other by representing a joint probability density across features, locations and transforms. In some embodiments, these probabilities may be represented independently, but often it is desirable for at least locations and transforms to be represented jointly.

Although process 1400 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

E. Dense Feature Collection

Figure 15:
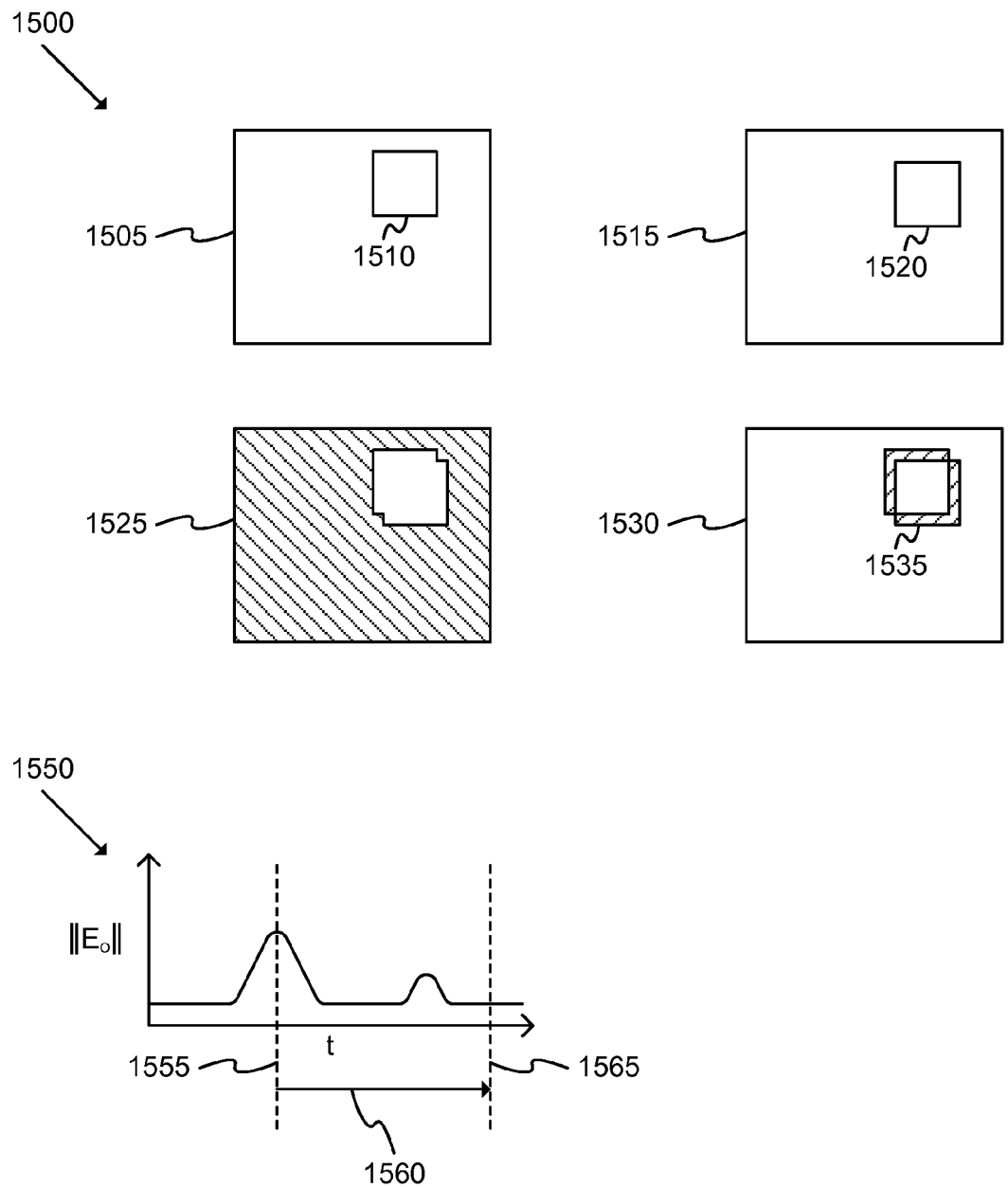
FIG. 15 illustrates a sequence of images used by some embodiments to estimate occluding edges of a transforming object and an x-y plot of occlusion error over time.

FIG. 15 illustrates a sequence of images 1500 used by some embodiments to estimate occluding edges of a transforming object and an x-y plot of occlusion error over time. In this example, the first image 1505 includes an object 1510 (or feature) at a particular position. The second image 1515 includes the object at a different location 1520. The third image 1525 includes a shaded area that represents the background of the first and second images 1505 and 1515. Such a background section may be identified using a low-pass filter to identify regionally coherent motion and/or other appropriate ways.

The fourth image 1530 represents an occlusion error as shaded area 1535. The error may be calculated based on the first and second images 1505 and 1515 and may be calculated using a high-pass filter, for example. The x-y plot 1550 represents occlusion error over time and indicates a peak in relative velocity 1555, a propagation delay 1560 and an indication 1565 of when a photo is taken. The peak in the magnitude of errors induced by occlusion, may be used to select a set of frames in the preceding history (e.g., sequence 1290) which may be processed to return the most informative dense labels which may then be treated as scene features during of system (e.g., system 100).

Figure 16:
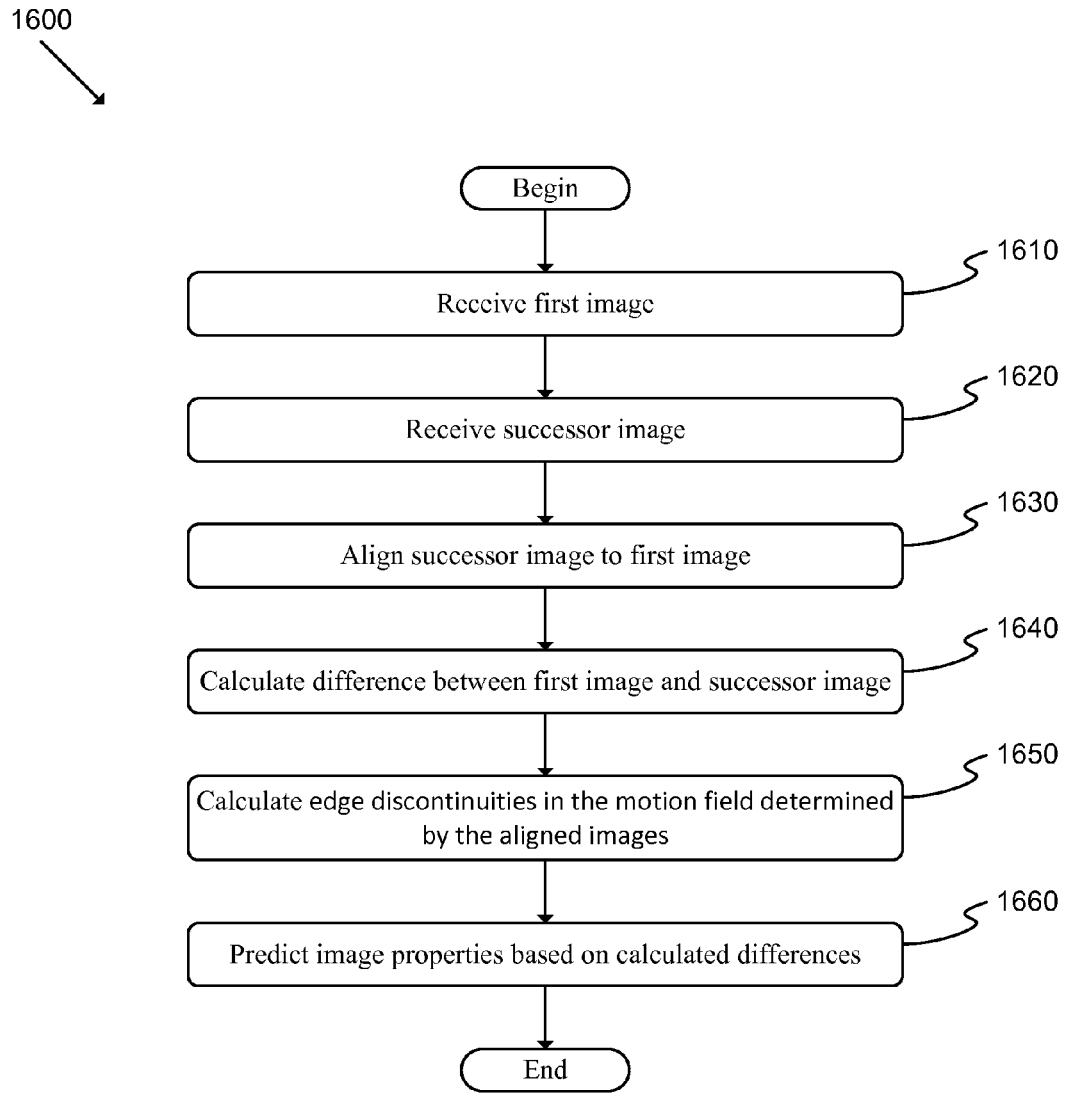
FIG. 16 illustrates a flow chart of a conceptual process used by some embodiments to predict image properties using sequences of images.

FIG. 16 illustrates a flow chart of a conceptual process 1600 used by some embodiments to predict image properties using sequences of images. Process 1600 will be described with reference to FIG. 15. Process 1600 may begin, for instance, when a scene is being evaluated by some embodiments.

The process may then receive (at 1610) a first image (e.g., image 1505). Next, the process may receive (at 1620) a successor image (e.g., image 1515). The process may then align (at 1630) the successor image to the first image using, for example, cross-correlation (and/or other appropriate ways, such as minimizing the difference with a smooth distortion map, or finding the affine transformation that best fits reliable key points). Next, process 1600 may calculate (at 1640) a difference between the first image and the successor image.

Process 1600 may then calculate (at 1650) one or more edge discontinuities in the motion field determined by the aligned images. Process 1600 may employ low pass (e.g., image 1525) and/or high pass filters (e.g., image 1530). Edge discontinuity in the motion field may be calculated using a horizontal motion field that is filtered with a high pass filter. Alternatively, the direction of the motion flow field is not restricted to horizontal and/or the filter may be a band pass or low pass filter. The spatial derivative may be calculated in a manner optimized for a particular spatial scale. In other cases, a Bayesian method may be used, for example with a stick breaking prior. The process may then predict (at 1660) image properties based on the calculated discontinuities.

Although process 1600 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of subprocesses and/or as part of a larger macro process.

Some embodiments may utilize the image information in various different ways. For instance, when a moving object is identified, dense labels may be used to indicate the speed of movement, direction of movement, etc. Such dense labels may be embedded into image data such that the labels are transparent to external systems but are able to be read and utilized by some embodiments.

F. Feature Association

Figure 17:
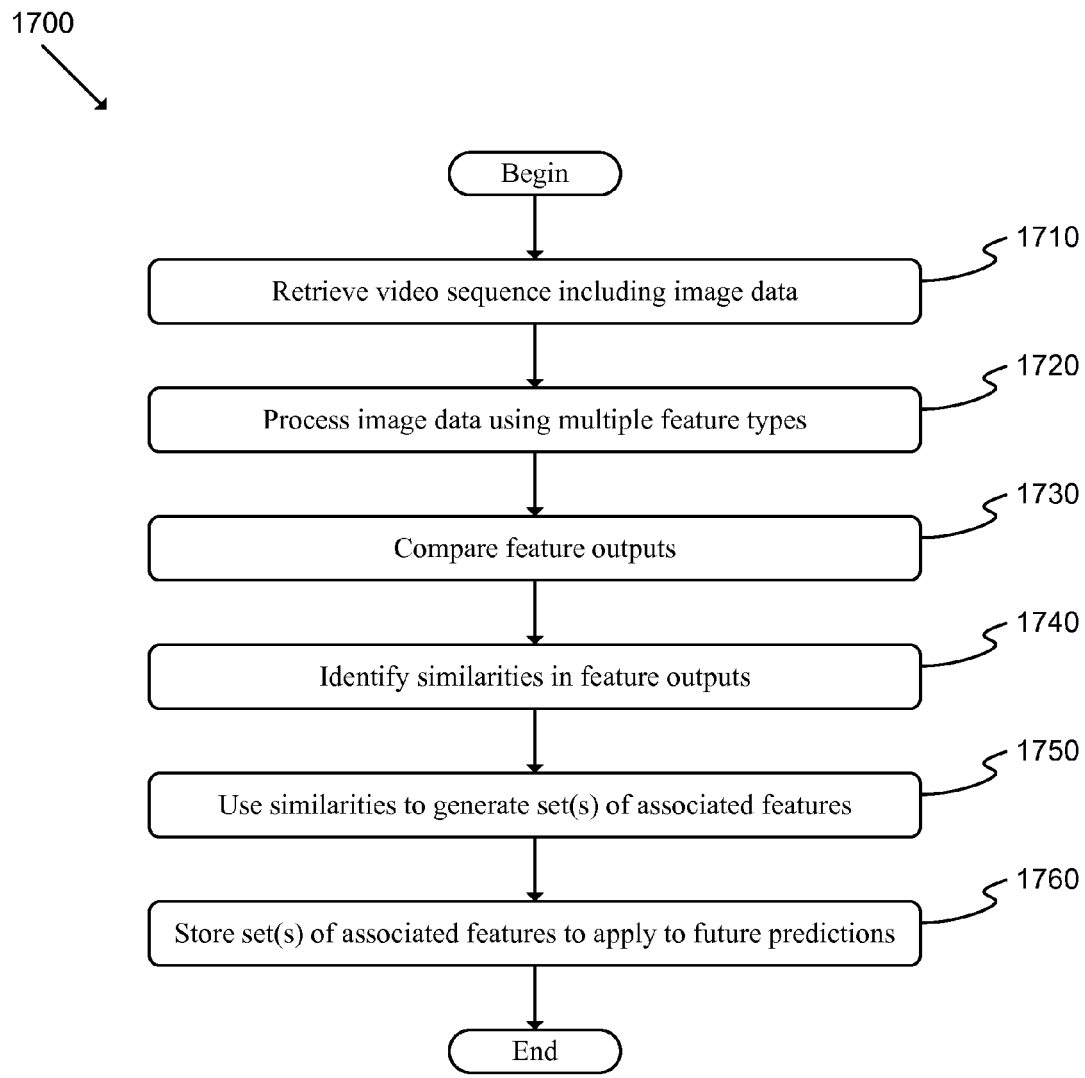
FIG. 17 illustrates a conceptual process used by some embodiments to group features.

FIG. 17 illustrates a conceptual process 1700 used by some embodiments to group features. Such a process may begin, for instance, when a set of associated images is made available. As shown, the process may retrieve (at 1710) a video sequence that includes images. Next, the process may process (at 1720) the image data using multiple feature types (such processing and feature types may include filtering the image data using different filter types). The process may then compare (at 1730) the feature outputs (e.g., the filter outputs). Next, the process may identify (at 1740) similarities in the feature outputs. Such similarities may be identified in various appropriate ways using various appropriate algorithms and parameters (e.g., by detecting significant coherence in the phase of the spectral power within a temporal envelope that matches the activity shared across a subset of nodes).

Process 1700 may then use (at 1750) the similarities to group sets of associated features. Such features may be grouped based on various appropriate similarity criteria. The process may then store (at 1760) the generated sets of associated features such that the sets of associated features may be applied to future predictions.

Although process 1700 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of subprocesses and/or as part of a larger macro process.

G. Transformation Association

Figure 18:
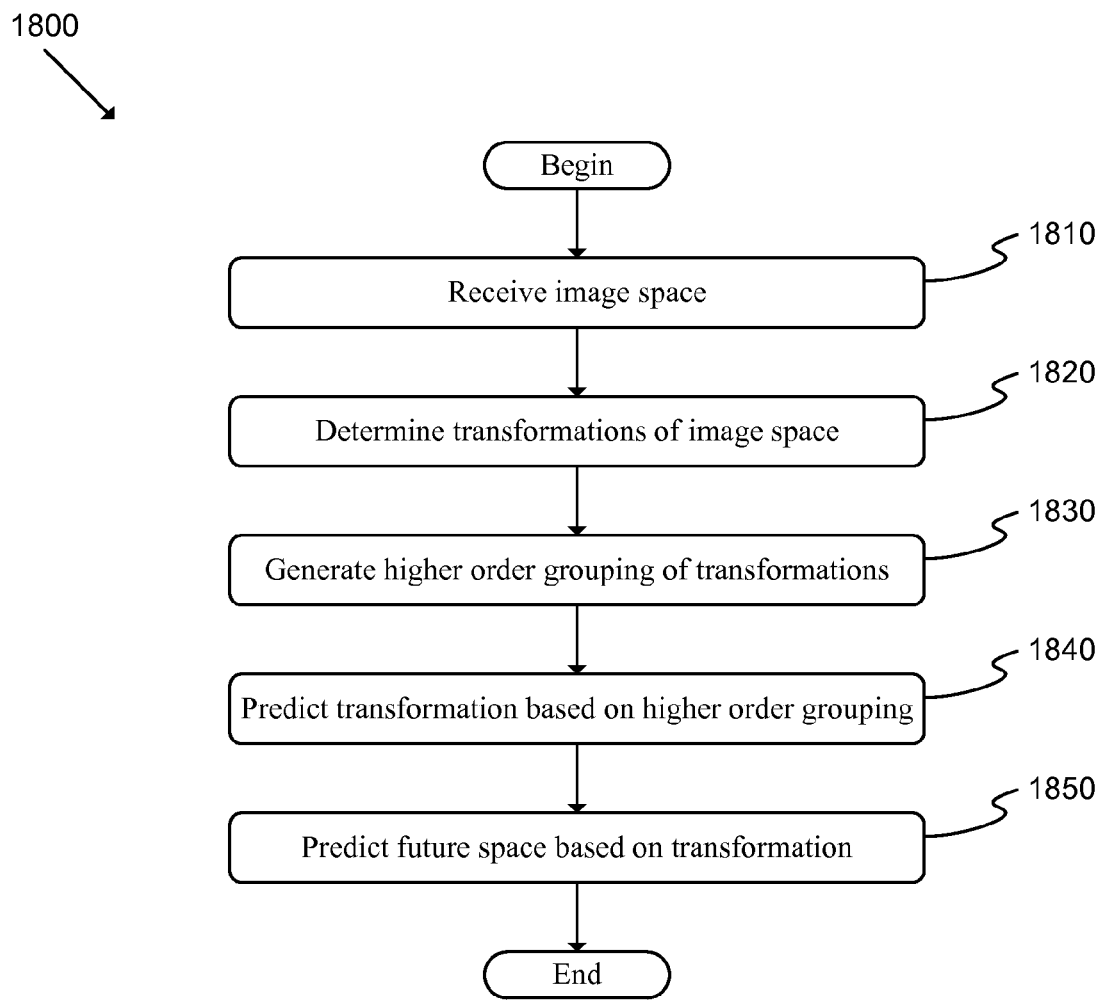
FIG. 18 illustrates a flow chart of a conceptual process used by some embodiments to predict and apply future transformations.

FIG. 18 illustrates a flow chart of a conceptual process 1800 used by some embodiments to predict and apply future transformations. Such a process may begin, for instance, when an image is made available for analysis. As shown, the process may receive (at 1810) an image space (and an associated transform). The process may then determine (at 1820) transformations of the image space. Next, the process may generate 1830 a higher order grouping of transformations. A transformation may then be predicted (at 1840) based at least partly on the higher order grouping. Process 1800 may then predict (at 1850) a future space based at least partly on the predicted transformation.

Process 1800 may be applied in various appropriate ways. For instance, some embodiments may determine acceleration of an object and use the determined acceleration to predict the velocity of the object. In another example, a person may be walking and begin to turn right which may allow a prediction that the person will continue to turn right (at least for some expected time or distance). As another example, some embodiments may allow prediction of a flight path of a bird, with the ability to recognize the different expectations regarding a bird that is flying generally horizontally at a steady pace and a bird that is starting to dive.

Although process 1800 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of subprocesses and/or as part of a larger macro process.

IV. Cost-Based Feature Analysis

Figure 19:
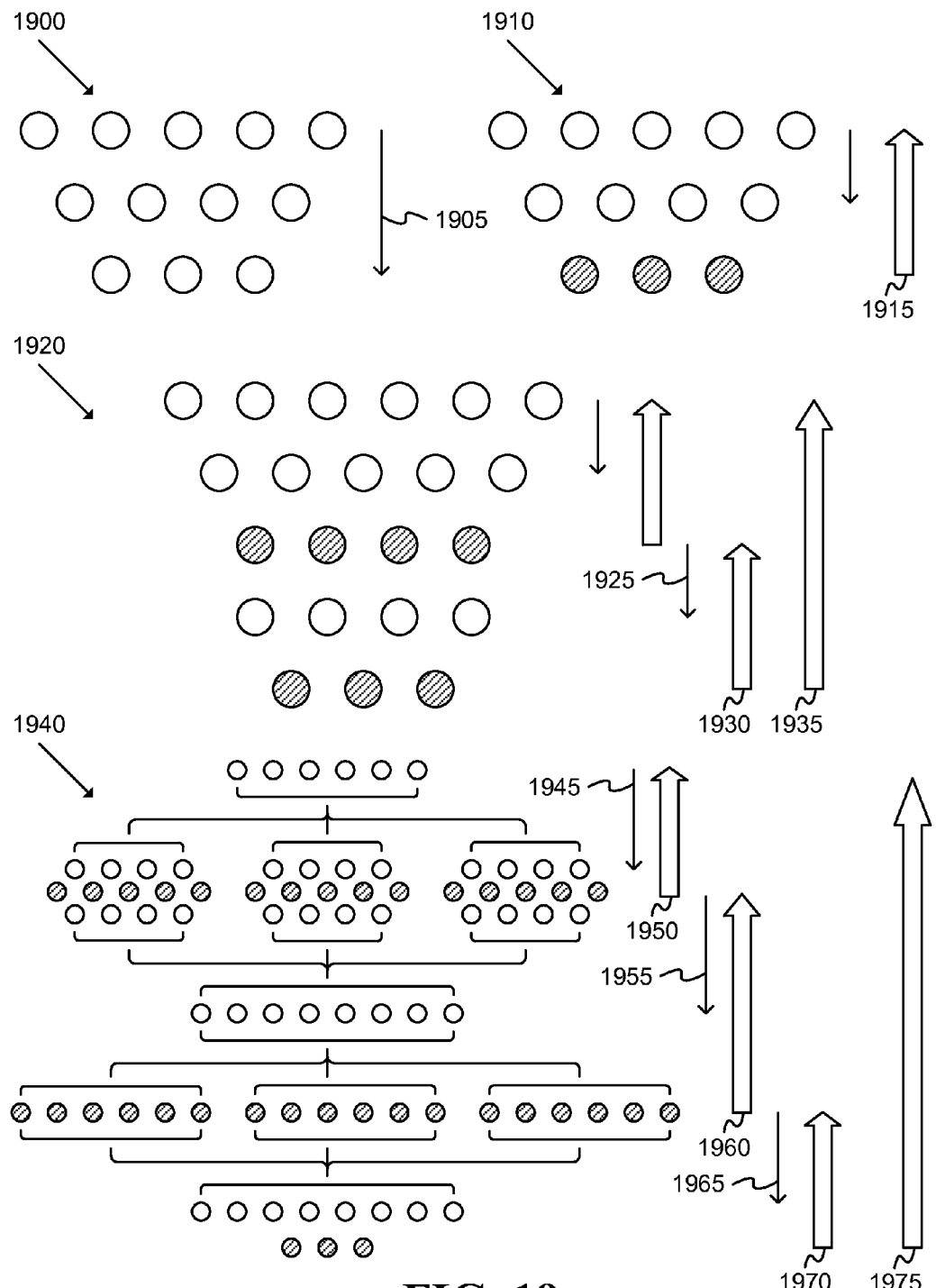
FIG. 19 illustrates training processes used by some embodiments and two example configurations for combining supervised and unsupervised learning.

FIG. 19 illustrates training processes 1900 and 1910 used by some embodiments and two example configurations 1920 and 1940 for combining supervised and unsupervised learning. Training process 1900 illustrates unsupervised learning across multiple levels (e.g., low, mid, high). Such unsupervised learning may include a process whereby the state at the base of the arrow 1905 may impact the weight updates at the levels along the direction of the arrow (e.g., the activity at the low level may drive the mid-level, thus affecting the weights from low level to mid-level).

Training process 1910 illustrates supervised learning across multiple levels (e.g., low, mid, mid-estimated). Such supervised learning may include a process whereby the errors from the estimated features are used to assign blame to the nodes that most impacted the errors. Such blame may proportionally affect the magnitude of the update to each weight, according to a back propagation learning algorithm implemented along the direction of arrow 1915. Such a scheme may be used to update multiple preceding levels.

The first example hybrid configuration 1920 illustrates combined supervised and unsupervised learning across multiple levels (e.g., from top to bottom, low, mid, mid estimate, high, and high estimate). The low level features may be learning or designed, using state of the art front-end features. The mid-level features may be learned unsupervised from the low level (i.e., from the "bottom up") initially, before propagating learning down each pass. The mid estimate may use supervised top down learning only, the high level may be generated using unsupervised bottom-up learning initially, then also each down pass, the high estimate may be based on supervised top down learning only. Additional levels 1925 of unsupervised learning may be added, and additional levels of supervised learning 1930 may also be added. In addition, supervised learning 1935 may affect multiple preceding layers. Such an approach may be particularly desirable for fine tuning at the last stage, when a system is to be deployed for a particular task, or set of tasks, and the cost function of the task can be applied to impact the back propagation.

The second example hybrid configuration 1940 illustrates an alternative combination of supervised and unsupervised learning across multiple levels (e.g., from top to bottom, low (e.g., appearance features 315), mid (e.g., learned features 320-0230), estimated mid (e.g., estimated features 335-345), high, mixing hidden layer (variable topologies may be effective for different problems), second estimated layer, second mixing hidden layer, and task specific decision units).

Some embodiments may perform unsupervised learning 1945 for each learned features (these layers may learn different weights, for example if a ratio of density to number of nodes differs). In some cases the weights may be the same across multiple learned features during initial training, but then diverge later. Some embodiments may perform supervised learning 1950 which back propagates costs. Unsupervised learning 1955 may be performed within each learned feature, and from learned features to the mixing hidden layer. Supervised learning 1960 may back propagate costs. Unsupervised learning 1965 may proceed directly from the estimated feature to the second mixing hidden layer. Supervised learning 1970 may then back propagate costs (only one layer in this example). Supervised learning 1975 may back propagate costs across the whole system.

Additional levels of unsupervised learning 1955 and 1965 may be added. Additional levels of supervised learning 1960 and 1970 may be added. Supervised learning 1975 may affect multiple (or all) preceding layers.

Mixing layers may be used to integrate the results of previous levels with many types. Allowing a level before and after each estimated level is a valuable design pattern that allows for rich mappings between one estimated feature level and the next.

Figure 20:
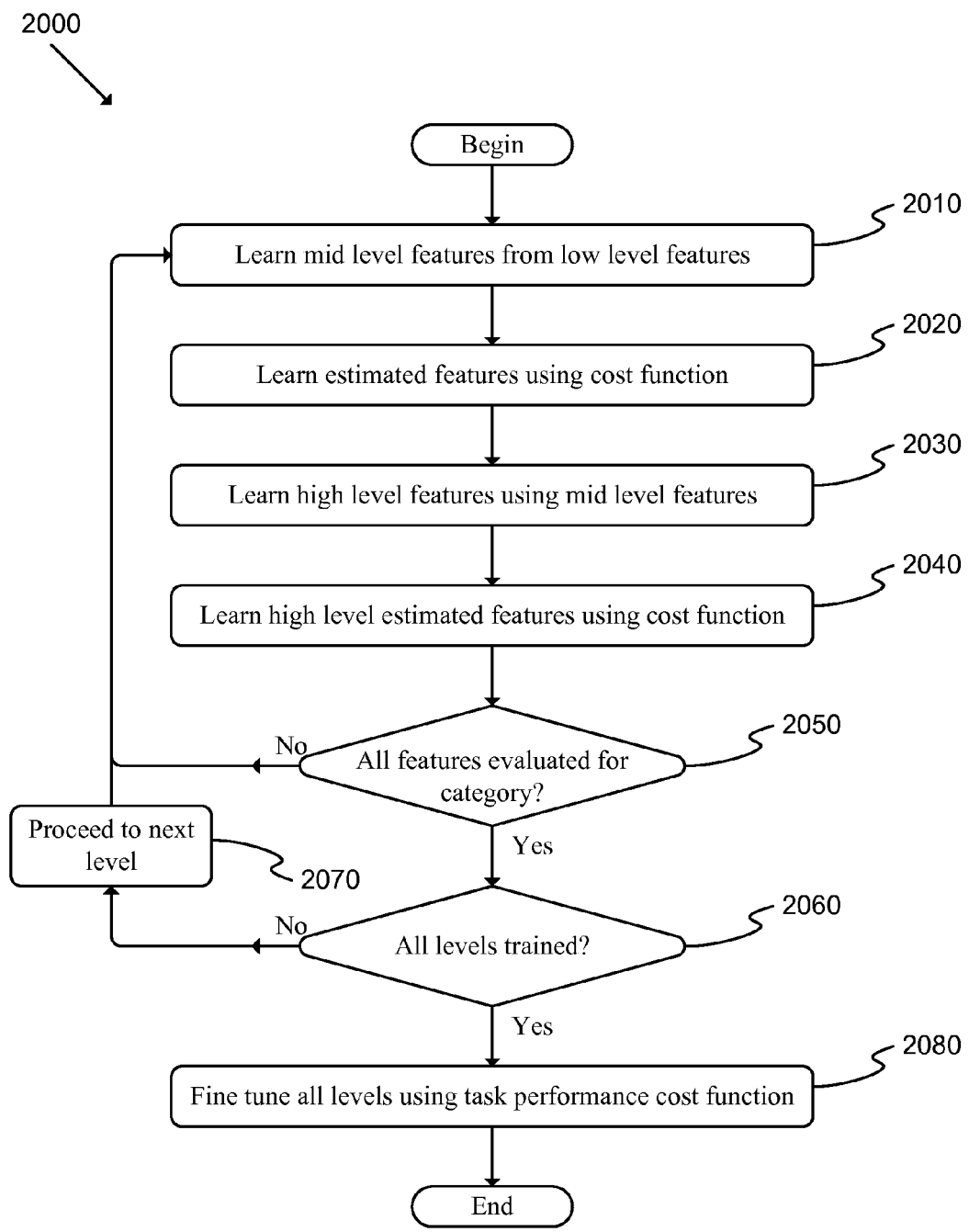
FIG. 20 illustrates a flow chart of a conceptual process used by some embodiments to train both supervised and unsupervised levels in a system of some embodiments.

FIG. 20 illustrates a flow chart of a conceptual process 2000 used by some embodiments to train both supervised and unsupervised levels in a system of some embodiments. Such a process may begin, for instance, when a set of features is being trained. As shown, the process may learn (at 2010) mid-level features from low-level features. Such learning may be performed in various appropriate ways (e.g., using correlation-based unsupervised learning such as Oja's rule).

Next, process 2000 may learn (at 2020) estimated features using a cost function. Such learning may include, for each image, performing a forward pass from low level to mid-level, performing a forward pass from mid-level to estimated mid-level features, determining an error associated with estimate using ground truth measurements, determining a cost of the error, and propagating the error back down the chain, from mid-level to low level, to update mid-level to estimated mid-level proportionally and, optionally, to update low level to mid-level proportionally.

The process may then learn (at 2030) high level features from mid-level estimated features. Such learning may include, for each image, performing a forward pass from low level to mid-level, performing a forward pass from mid-level to estimated features, performing a forward pass from estimated mid-level features to high-level and applying correlation-based unsupervised learning.

Next, the process may learn (at 2040) high level estimated features using a cost function. Such learning may involve, for each image, performing a forward pass from low level to mid-level, performing a forward pass from mid-level to estimated features, performing a forward pass from estimated features to high-level, and performing a forward pass from high level to estimated high level. An error associated with the estimate may be determined using ground truth measures. The cost of the error may be determined and propagated back down the chain by updating high-level to estimated high level proportionally and, optionally, updating estimated mid-level to high-level proportionally by updating mid-level to estimated mid-level proportionally and updating low level to mid-level proportionally.

Process 2000 may then determine (at 2050) whether all features have been evaluated for a category. If the process determines (at 2050) that not all features have been evaluated, the process may perform operations 2010-2050 until the process determines (at 2050) that all features have been evaluated for a category at which point the process may determine (at 2060) whether all levels have been trained. When the process determines (at 2060) that not all levels have been trained, the process may proceed (at 2070) to the next level and repeat operations 2010-2060 until the process determines (at 2060) that all levels have been trained.

When the process determines (at 2060) that all levels have been trained, the process may then fine tune (at 2080) all levels using a task performance cost function (where such a cost function may integrate multiple tasks).

In some embodiments, process 2000 may allow Alternating among supervised and unsupervised levels. Each level may be learned sequentially, where unsupervised does not require dense labels, supervised levels use dense labels, supervised learning always impacts the weights from the level directly below, and supervised learning optionally impacts other levels via back propagation. Most learning is task independent. The last stage of learning may involve learning that back-propagates a cost sensitive error that integrates over multiple desired tasks.

Although process 2000 has been described with reference to various details one of ordinary skill in the art will recognize that the process may be implemented in various appropriate ways without departing from the spirit of the invention. For instance, the various process operations may be performed in different orders. In addition, one or more operations may be omitted and/or one or more other operations included. Furthermore, the process may be implemented as a set of sub-processes and/or as part of a larger macro process.

V. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 21:
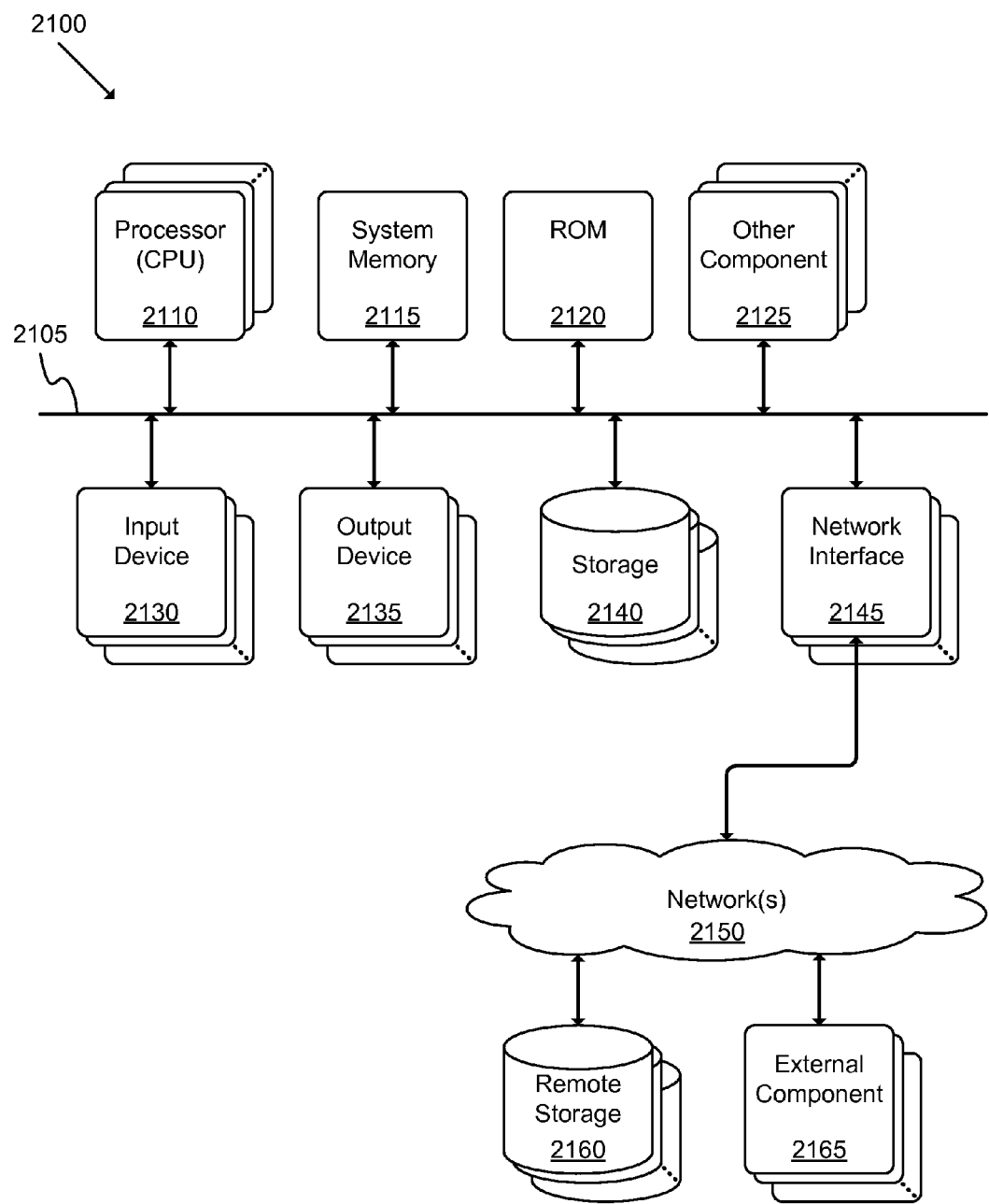
FIG. 21 conceptually illustrates a schematic block diagram of a computer system with which some embodiments of the invention may be implemented.

FIG. 21 conceptually illustrates a schematic block diagram of a computer system 2100 with which some embodiments of the invention may be implemented. For example, the systems described above in reference to FIGS. 7-8 may be at least partially implemented using computer system 2100. As another example, the processes described in reference to FIGS. 6, 10, 11, 13-15, and 17-20 may be at least partially implemented using sets of instructions that are executed using computer system 2100.

Computer system 2100 may be implemented using various appropriate devices. For instance, the computer system may be implemented using one or more personal computers ("PC"), servers, mobile devices (e.g., a Smartphone), tablet devices, cameras, and/or any other appropriate devices. The various devices may work alone (e.g., the computer system may be implemented as a single PC) or in conjunction (e.g., some components of the computer system may be provided by a mobile device while other components are provided by a tablet device).

Computer system 2100 may include a bus 2105, at least one processing element 2110, a system memory 2115, a read-only memory ("ROM") 2120, other components (e.g., a graphics processing unit) 2125, input devices 2130, output devices 2135, permanent storage devices 2140, and/or network interfaces 2145. The components of computer system 2100 may be electronic devices that automatically perform operations based on digital and/or analog input signals.

Bus 2105 represents all communication pathways among the elements of computer system 2100. Such pathways may include wired, wireless, optical, and/or other appropriate communication pathways. For example, input devices 2130 and/or output devices 2135 may be coupled to the system 2100 using a wireless connection protocol or system. The processor 2110 may, in order to execute the processes of some embodiments, retrieve instructions to execute and data to process from components such as system memory 2115, ROM 2120, and permanent storage device 2140. Such instructions and data may be passed over bus 2105.

ROM 2120 may store static data and instructions that may be used by processor 2110 and/or other elements of the computer system. Permanent storage device 2140 may be a read-and-write memory device. This device may be a non-volatile memory unit that stores instructions and data even when computer system 2100 is off or unpowered. Permanent storage device 2140 may include a mass-storage device (such as a magnetic or optical disk and its corresponding disk drive).

Computer system 2100 may use a removable storage device and/or a remote storage device as the permanent storage device. System memory 2115 may be a volatile read-and-write memory, such as a random access memory ("RAM"). The system memory may store some of the instructions and data that the processor uses at runtime. The sets of instructions and/or data used to implement some embodiments may be stored in the system memory 2115, the permanent storage device 2140, and/or the read-only memory 2120. Other components 2125 may perform various other functions. These functions may include, for instance, image rendering, image filtering, etc.

Input devices 2130 may enable a user to communicate information to the computer system and/or manipulate various operations of the system. The input devices may include keyboards, cursor control devices, audio input devices and/or video input devices. Output devices 2135 may include printers, displays, and/or audio devices. Some or all of the input and/or output devices may be wirelessly or optically connected to the computer system.

Finally, as shown in FIG. 21, computer system 2100 may be coupled to a network 2150 through a network interface 2145. For example, computer system 2100 may be coupled to a web server on the Internet such that a web browser executing on computer system 2100 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2100 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. A system disposed to implement a learning rule in a three-dimensional (3D) environment, the system comprising:
   a renderer disposed to generate a plurality of two-dimensional (2D) images based at least partly on a set of 3D scenes;
   a computational element disposed to generate a set of appearance features based at least partly on at least one 2D image from among the plurality of 2D images; and
   an attribute classifier disposed to generate at least one set of learned features based at least partly on each set of appearance features and to generate a set of estimated scene features based at least partly on each set of learned features.

2. The system of claim 1 further comprising a plurality of update elements, including a first update element disposed to evaluate the set of estimated scene features and the learning rule and update a first set of parameters used to generate a particular set of learned features from among the at least one set of learned features.

3. The system of claim 2 further including a second update element disposed to evaluate the set of estimated scene features and the learning rule and update a second set of parameters used to generate the set of estimated scene features.

4. The system of claim 3, wherein at least one 3D scene comprises a virtual environment.

5. The system of claim 3, wherein the renderer is a camera disposed to capture each 2D image.

6. The system of claim 3, wherein each 3D scene comprises a set of true labels of scene features, and each of the first and second sets of updated parameters is based at least partly on the set of true labels.

7. The system of claim 6, wherein each set of true labels comprises a spatial map of Boolean values.

8. The system of claim 3, wherein:
   each learned feature in the set of learned features is calculated based at least partly on a non-linear function applied to a sum of cross products of a vector of appearance features and a 2D update matrix updated by the first update element; and
   each estimated scene feature in the set of estimated scene features is calculated based at least partly on the non-linear function applied to a sum of cross products of a vector of learned features and a 2D update matrix updated by the second update element.

9. An automated method disposed to provide learning about a three-dimensional (3D) scene using a set of two-dimensional (2D) images, the method comprising:
   labeling each image from among the set of 2D images with scene information regarding the 3D scene, the scene information being associated with the labeled image;
   selecting a set of learning modifiers based at least partly on the labeling of at least two images; and
   updating a set of weights based at least partly on the set of learning modifiers.

10. The automated method of claim 9 further comprising determining whether the selected set of modifiers is appropriate for a particular image.

11. The automated method of claim 9 further comprising determining whether to render and learn from a particular 3D scene.

12. The automated method of claim 9, wherein the 3D scene includes a set of true labels regarding object properties associated with the 3D scene.

13. The automated method of claim 9, further comprising rendering and sampling each 2D image from the set of 2D images.

14. The automated method of claim 9 further comprising evaluating at least two 2D images from the set of 2D images using a current visual algorithm.

15. The automated method of claim 9, wherein the labeling, selecting, and updating operations are performed iteratively for each image in the set of 2D images.

16. The automated method of claim 9, wherein each image in the set of 2D images is associated with the 3D scene.

17. A non-transitory computer readable medium storing an image evaluation application disposed to provide learning about a three-dimensional (3D) scene using a set of two-dimensional (2D) images, the application comprising sets of instructions for:

labeling each image from among the set of 2D images with scene information regarding the 3D scene, the scene information being associated with the labeled image;

selecting a set of learning modifiers based at least partly on the labeling of at least two images; and updating a set of weights based at least partly on the set of learning modifiers.

18. The non-transitory computer readable medium of claim 17 further comprising sets of instructions for determining whether the selected set of modifiers is appropriate for a particular image.

19. The non-transitory computer readable medium of claim 17 further comprising sets of instructions for determining whether to render and learn from a particular 3D scene.

20. The non-transitory computer readable medium of claim 17, wherein the 3D scene includes a set of true labels regarding object properties associated with the 3D scene.

* * * * *